United States Patent
Nightingale et al.

(10) Patent No.: US 8,205,244 B2
(45) Date of Patent: Jun. 19, 2012

(54) SYSTEMS AND METHODS FOR GENERATING, MANAGING, AND DISPLAYING ALARMS FOR WIRELESS NETWORK MONITORING

(75) Inventors: Todd W. Nightingale, Atlanta, GA (US); Lakshmaiah Regoti, Cumming, GA (US); Kailash Kailash, San Jose, CA (US); Vikas Sood, Cumming, GA (US); Samuel J. Crank, Canton, GA (US)

(73) Assignee: AirDefense, Inc., Alpharetta, GA (US)

( * ) Notice: Subject to any disclaimer, the term of this patent is extended or adjusted under 35 U.S.C. 154(b) by 1171 days.

(21) Appl. No.: 11/711,371

(22) Filed: Feb. 27, 2007

(65) Prior Publication Data
US 2008/0209517 A1    Aug. 28, 2008

(51) Int. Cl.
*H04L 9/32* (2006.01)
(52) U.S. Cl. ............... 726/3; 726/24; 379/44; 709/203; 709/224
(58) Field of Classification Search .......... 726/3, 22–23, 726/24; 379/44; 709/203, 224
See application file for complete search history.

(56) References Cited

U.S. PATENT DOCUMENTS

| | | | |
|---|---|---|---|
| 6,356,282 B2 * | 3/2002 | Roytman et al. | 715/736 |
| 6,628,642 B1 * | 9/2003 | Mile'n et al. | 370/350 |
| 7,366,202 B2 * | 4/2008 | Scherzer et al. | 370/480 |
| 2004/0236851 A1 * | 11/2004 | Kuan et al. | 709/224 |
| 2005/0237182 A1 * | 10/2005 | Wang | 340/539.1 |
| 2007/0240222 A1 * | 10/2007 | Tuvell et al. | 726/24 |

OTHER PUBLICATIONS

Hsin et al., A Distributed Monitoring Mechanism for Wireless Sensor Networks, Sep. 2002, ACM, ACM 1-58113-585.*

* cited by examiner

*Primary Examiner* — Jeffrey Pwu
*Assistant Examiner* — Samuel Ambaye
(74) *Attorney, Agent, or Firm* — Clements Bernard PLLC; Lawrence A. Baratta, Jr.; Christopher L. Bernard

(57) ABSTRACT

The present disclosure is directed to systems and methods for generating, managing, and displaying alarms associated with monitoring a wireless network. Advantageously, the present disclosure provides one alarm per security event, and the ability to see an event in context over time and aggregate information. This results in a significant reduction in alarm volume for wireless monitoring which increases manageability and reduces storage requirements. Further, this provides better security by avoiding the "needle in the haystack" problem where you see few actionable alarms rather than being flooded by multiple copies of the same event over time. Finally, the present disclosure provides improved system scalability with large deployments by managing alarms through lesser alarm volume, and through visual representation.

20 Claims, 23 Drawing Sheets

SYSTEMS AND METHODS FOR GENERATING, MANAGING, AND DISPLAYING ALARMS FOR WIRELESS NETWORK MONITORING

CROSS-REFERENCE TO RELATED APPLICATION(S)

This application incorporates by this reference in their entirety for all purposes commonly assigned U.S. patent applications filed Jun. 3, 2002:

| application Ser. No. | Title |
| --- | --- |
| 10/161,142 | "SYSTEMS AND METHODS FOR NETWORK SECURITY" |
| 10/161,440 | "SYSTEM AND METHOD FOR WIRELESS LAN DYNAMIC CHANNEL CHANGE WITH HONEYPOT TRAP" |
| 10/161,443 | "METHOD AND SYSTEM FOR ACTIVELY DEFENDING A WIRELESS LAN AGAINST ATTACKS" |
| 10/160,904 | "METHODS AND SYSTEMS FOR IDENTIFYING NODES AND MAPPING THEIR LOCATIONS" |
| 10/161,137 | "METHOD AND SYSTEM FOR ENCRYPTED NETWORK MANAGEMENT AND INTRUSION DETECTION" |

Furthermore, this application incorporates by reference in their entirety for all purposes commonly assigned U.S. patent applications filed Nov. 4, 2003:

| application Ser. No. | Title |
| --- | --- |
| 10/700,842 | "SYSTEMS AND METHODS FOR AUTOMATED NETWORK POLICY EXCEPTION DETECTION AND CORRECTION" |
| 10/700,914 | "SYSTEMS AND METHOD FOR DETERMINING WIRELESS NETWORK TOPOLOGY" |
| 10/700,844 | "SYSTEMS AND METHODS FOR ADAPTIVELY SCANNING FOR WIRELESS COMMUNICATIONS" |

Furthermore, this application incorporates by reference in their entirety for all purposes commonly assigned U.S. patent applications filed Feb. 6, 2004:

| application Ser. No. | Title |
| --- | --- |
| 10/774,034 | "SYSTEMS AND METHODS FOR ADAPTIVE LOCATION TRACKING" |
| 10/774,111 | "WIRELESS NETWORK SURVEY SYSTEMS AND METHODS" |
| 10/774,896 | "SYSTEMS AND METHODS FOR ADAPTIVE MONITORING WITH BANDWIDTH CONSTRAINTS" |
| 10/774,915 | "DYNAMIC SENSOR DISCOVERY AND SELECTION SYSTEMS AND METHODS" |

Furthermore, this application incorporates by reference in its entirety for all purposes commonly assigned U.S. patent applications filed Oct. 19, 2005:

| application Ser. No. | Title |
| --- | --- |
| 11/253,316 | "PERSONAL WIRELESS MONITORING AGENT" |

Furthermore, this application incorporates by reference in its entirety for all purposes commonly assigned U.S. patent applications filed Jan. 13, 2006:

| application Ser. No. | Title |
| --- | --- |
| 11/332,065 | "SYSTEMS AND METHODS FOR WIRELESS INTRUSION DETECTION USING SPECTRAL ANALYSIS" |

Furthermore, this application incorporates by reference in their entirety for all purposes commonly assigned U.S. patent applications filed Mar. 17, 2006:

| application Ser. No. | Title |
| --- | --- |
| 11/276,925 | "SYSTEMS AND METHODS FOR WIRELESS SECURITY USING DISTRIBUTED COLLABORATION OF WIRELESS CLIENTS" |
| 11/276,930 | "SYSTEMS AND METHODS FOR WIRELESS NETWORK FORENSICS" |

This application also incorporates by reference in its entirety for all purposes commonly assigned U.S. patent application filed May 10, 2006:

| application Ser. No. | Title |
| --- | --- |
| 11/382,590 | "RFID INTRUSION PROTECTION SYSTEM AND METHODS" |

This application also incorporates by reference in its entirety for all purposes commonly assigned U.S. patent application filed Jun. 16, 2006:

| application Ser. No. | Title |
| --- | --- |
| 11/424,628 | "SYSTEMS AND METHODS FOR WIRELESS CONTENT FILTERING" |

This application also incorporates by reference in its entirety for all purposes commonly assigned U.S. patent application filed Aug. 11, 2006:

| application Ser. No. | Title |
| --- | --- |
| 11/464,043 | "METHODS AND SYSTEMS FOR WIRED EQUIVALENT PRIVACY AND WI-FI PROTECTED ACCESS PROTECTION" |

This application also incorporates by reference in its entirety for all purposes commonly assigned U.S. patent application filed Nov. 22, 2006:

| application Ser. No. | Title |
|---|---|
| 11/603,814 | "SYSTEMS AND METHODS FOR PROACTIVELY ENFORCING A WIRELESS FREE ZONE" |

FIELD OF THE INVENTION

This disclosure relates to wireless network security systems and methods, and more particularly to systems and methods for generating, managing, and displaying alarms associated with wireless network intrusion monitoring and prevention.

BACKGROUND OF THE INVENTION

Wireless communications, such as IEEE 802.11 (WiFi), have proliferated due to the availability of wireless spectrum and wireless communications components. Traditional wired networks use cables to transfer information. Cables are a controlled medium, protected by the buildings that enclose them. External traffic that enters a wired network is policed by a firewall and established wired intrusion-protection technologies. To gain access to a wired network, an intruder or hacker must bypass the physical security of the building or breach the firewall.

Wireless networks, on the other hand, use the airspace to transfer information. The airspace is an uncontrolled and shared medium—it lacks the equivalent physical control of its wired counterpart. Once a user connects a wireless access point (AP) into the network, its signals can travel through the walls, ceilings, and windows of the building, exposing the traditionally secure physical and link layers. This renders the entire network accessible from another floor of the building, from an adjoining building, from the parking lot, or from across the street. Radio signals from a single wireless AP can travel up to thousands of feet outside of the building. Additionally, wireless devices share the airspace. Any wireless device in the network can sniff all the traffic of all other wireless devices within the same the basic service set.

As wireless networks proliferate and costs decrease for wireless components, networks are becoming more insecure due to the inherent security weaknesses of wireless networks. Enterprises have deployed wireless monitoring systems such as wireless intrusion prevention systems (WIPS) and/or wireless intrusion detection systems (WIDS) to proactively monitor and prevent attacks on the wireless networks. Wireless monitoring systems are configured to monitor a wireless network continuously (i.e., 24×7) and provide the most advanced solution for rogue detection and prevention, intrusion detection, policy monitoring and compliance, automated protection, historical analysis, and remote troubleshooting FIG. 1 illustrates an exemplary embodiment of a local network 100 including both wired and wireless components. The wired components depicted in FIG. 1 include a variety of connected systems such as local servers 120, local clients 130 and network accessible data storage servers 110. The local servers 120, local clients 130, and data servers 110 are connected through an Ethernet 150 connection. A router 140 connects the Ethernet 150 and the components 110, 120, 130 to an external network 160 such as the Internet. A firewall 145 can be included to protect the wired local network and act as a security gate to prevent unauthorized traffic coming from the network 160 such as a potential hacker 135. A firewall 145 can effectively deter an attack from a wired hacker 135 via the network 160.

By installing wireless access points (AP) 180a, 180b to the wired network (e.g., Ethernet 150 and router 140), personal computers and laptops equipped with wireless local area network (WLAN) cards create a wireless network 170a, 170b which can connect to the wired network at broadband speeds (i.e., 11 Mb/s to 54 Mb/s) using IEEE 802.11a/b/g protocols for example.

Wireless networks 170a, 170b operate over the airspace which is an uncontrolled and shared medium lacking the equivalent physical control of its wired counterpart. As such, wireless hackers 185a, 185b can enter the local network 100 through the access points 180a, 180b even if the access points 180a, 180b are located behind the firewall 145. Therefore, wireless networks 170a, 170b (in conjunction with access points 180a, 180b) can provide opportunities for unauthorized users to attack a network, which can include in various examples: a local area network, a wide area network, a metropolitan area network, a corporate intranet, among many others.

A wireless AP 180c can be installed unbeknownst to the enterprise (e.g., rogue AP) or it can be installed and misconfigured (e.g. misconfigured AP). As such, the AP 180c can also provide opportunities for unauthorized users to access the network. Due to the low cost of APs 180c, anyone with access to an enterprise can install a rogue AP 180c and connect it to the Ethernet 150 network providing complete wireless access to the enterprise. A misconfigured AP 180c can have the wrong encryption settings allowing any user to gain access to the enterprise.

Also, municipal wireless networks 195 are proliferating such as local governments providing free IEEE 802.11 access. These networks 195 can be used by a wireless hacker 185a to gain access to a device on the enterprise's wireless network 170a which is set to allow inbound connections effectively bypassing the enterprise firewall and content filtering. Additionally, mobile users 170c face threats from evil twin APs 180e which gain access to the user's 170c login credentials by posing as a legitimate AP 180d. Such a threat can allow the evil twin AP 180e to relay the credentials to a hacker for access to the enterprise's wireless network 170a, 170b.

In addition to IEEE 802.11 access, other wireless protocols 190 such as Bluetooth and WiMax are proliferating. Bluetooth is deployed within the enterprise with PDA, cellular phones, and the like. WiMax is a wireless standard for the delivery of last mile wireless broadband access as an alternative to cable and DSL.

The local network 100 can be configured with wireless sensors 202a, 202b and a server 201 for monitoring and preventing wireless intrusions on the wireless networks 170a, 170b. The sensors 202a, 202b connect to the Ethernet 150 network, and each sensor 202a, 202b is located to monitor and prevent intrusions over a pre-defined area for wireless activity. The sensors 202a, 202b are configured to monitor data transmitted on the wireless networks 170a, 170b and to communicate relevant data, events, and statistics to the server 201. The sensors 202a, 202b can be configured to monitor one or more wireless channels such as IEEE 802.11 standard channels and non-standard user-defined channels, Bluetooth, and WiMax channels. The sensors 202a, 202b can monitor more than one channel simultaneously if the sensors 202a, 202b are configured with multiple radios. The sensors 202a, 202b can include a local processor to perform data analysis on wireless events to minimize communications to the server 201.

The server 201 connects to the Ethernet 150 or optionally through the network 160 (not shown) and the server 201 is configured to receive and correlate data, events, and statistics from the sensors 202a, 202b. Further, multiple servers 201 can operate to provide redundancy and load-balancing. Additionally in some examples, access points 180a, 180b and/or local clients 130 can occasionally operate as sensors 202a, 202b to communicate data, events, and statistics to the server 201. Also, local clients 130 equipped with WLAN cards can be configured with software agents, allowing the local clients 130 to periodically monitor the wireless networks 170a, 170b and to communicate data, events, and statistics from monitoring the wireless networks 170a, 170b to the server 201.

The server 201 can be configured to detect attacks and events, network performance degradation, and network policy compliance on the wireless networks 170a, 170b. Further, the server 201 can be configured to direct the sensors 202a, 202b to terminate a rogue wireless client (e.g. an unauthorized user) such as wireless hackers 185a, 185b. Also, the server 201 can include a data store to log history and trends relating to monitoring of the wireless network 170a, 170b. The combination of the server 201 and sensors 202a, 202b is known as a wireless intrusion prevention system (WIPS) or a wireless intrusion detection system (WIDS). An example of a WIPS system is the AirDefense Enterprise Release 7.0 (available from the assignee, AirDefense, Inc. of Alpharetta, Ga.).

Upon receiving and correlating data, events, and statistics, the server 201 is configured to generate alarms and performance data relating to the wireless network. Also, the server 201 can include a data store to log history and trends relating to the wireless network. The server 201 includes a display means such as a graphical user interface (GUI) operable to notify and organize alarms and performance data for a network operator.

As wireless network deployments proliferate, the server 201 receives significantly more data, events, and statistics from the distributed sensors. For example, a WIPS or WIDS can be configured to generate alarms every minute depending on specific events that occur in that minute. Disadvantageously, this is more error prone, results in false positives, and generates multiple instances of the same alarm for a single event. Further, alarm storage is an issue. Furthermore, large scale deployments of wireless networks require a single interface to monitor and manage alarms and other data related to wireless networks.

Thus, systems and methods are needed to efficiently generate, manage, and display alarms and other data associated with monitoring wireless networks.

BRIEF SUMMARY OF THE INVENTION

The present disclosure is directed to systems and methods for generating, managing, and displaying alarms associated with monitoring a wireless network. Advantageously, the present disclosure provides one alarm per security event, and the ability to see an event in context over time and aggregate information. This results in a significant reduction in alarm volume for wireless monitoring which increases manageability and reduces storage requirements. Further, this provides better security by avoiding the "needle in the haystack" problem where you see few actionable alarms rather than being flooded by multiple copies of the same event over time. Finally, the present disclosure provides improved system scalability with large deployments by managing alarms through lesser alarm volume, and through visual representation.

In an exemplary embodiment of the present disclosure, a method of generating alarms for wireless network monitoring includes monitoring a wireless network, receiving events responsive to the monitoring step, correlating received events to triggers, and raising an alarm responsive to one or more triggers being above a pre-defined threshold value. The events correspond to custom-coded signatures or are semantically defined. The correlating step includes updating the trigger count corresponding to each received event. The trigger count is maintained in a hash table indexed to alarm type and device media access control address. Each trigger includes a watch time corresponding to the amount of time events are examined for and a high water threshold corresponding to the number of events in the watch time which corresponds to the trigger being above the pre-defined threshold value. The monitoring step is performed by a plurality of sensors, and the receiving, analyzing, and raising steps are performed by a server.

In another exemplary embodiment of the present disclosure, a method of managing alarms for wireless network monitoring includes the steps of receiving events from monitoring of a wireless network; correlating each received event to one or more triggers in which the received event participates, wherein the one or more triggers include a count of events of a pre-defined period; generating alarms over the pre-defined period responsive to triggers and trigger sets; and handling alarms to update active and inactive alarms. The method further includes the step of loading an alarm configuration, wherein the alarm configuration defines the each event to one or more triggers, one or more triggers to each trigger set, and each alarm to one or more trigger sets. The correlating step includes updating the one or more triggers in which the received event participates by updating the trigger count. The trigger count is maintained by a hash table including alarm objects for each alarm type and device media access control address. The generating step includes the steps of determining if each trigger count exceeds a high threshold over the pre-defined period, determining if each trigger count in a trigger set exceeds the high threshold for each trigger, and raising an alarm for each trigger set with all corresponding triggers exceeding the high threshold. The handling step includes the steps of determining if each trigger count is below a low threshold over the pre-defined period; if an alarm is active, and one of the triggers in the trigger set corresponding to the alarm is below the low threshold, then setting the alarm to inactive; and removing all inactive alarms which have been inactive for a duration period. The receiving, correlating, generating, and handling steps are performed by a server.

In yet another exemplary embodiment of the present disclosure, an alarm manager display for a wireless network includes an alarm table listing alarms in the wireless network, wherein each alarm includes a criticality, category, type, time, and wireless device; a network tree including logical groupings of wireless network devices; alarm information including detailed information about an alarm selected in the alarm table; and network alarm totals including a count of the total alarms in the wireless network and a pie chart depicting the breakdown of alarms by category and priority; wherein alarms in the alarm table can be filtered by alarm priority, device type, wireless channel, signal strength, device state, date and time, and alarm category and type; wherein alarms in the alarm table can be cleared by a user and kept cleared for a configurable time. The alarm manager display further includes an alarm details dialog including alarm information, user-editable alarm notes, alarm description, investigation information, and mitigation information. Also, the alarm manager display further includes an alarm configuration dialog for a user to configure settings for alarms. The criticality includes a user-editable threat calculation value between 0 and 100, wherein the threat calculation value is utilized to calculate a threat index for devices, groups, locations, and the wireless network. The alarm manager display is configure to minimize alarms by utilizing events, triggers, and trigger sets to provide one alarm per a plurality of events.

BRIEF DESCRIPTION OF THE DRAWINGS

Systems and methods of the present disclosure are illustrated and described herein with reference to the various drawings, in which like reference numbers denote like method steps and/or system components, respectively, and in which.

DETAILED DESCRIPTION OF THE INVENTION

The present disclosure is directed to systems and methods for generating, managing, and displaying alarms associated with monitoring a wireless network. Advantageously, the present disclosure provides one alarm per security event, and the ability to see an event in context over time and aggregate information. This results in a significant reduction in alarm volume for wireless monitoring which increases manageability and reduces storage requirements. Further, this provides better security by avoiding the "needle in the haystack" problem where you see few actionable alarms rather than being flooded by multiple copies of the same event over time. Finally, the present disclosure provides improved system scalability with large deployments by managing alarms through lesser alarm volume, and through visual representation.

Figure 1:
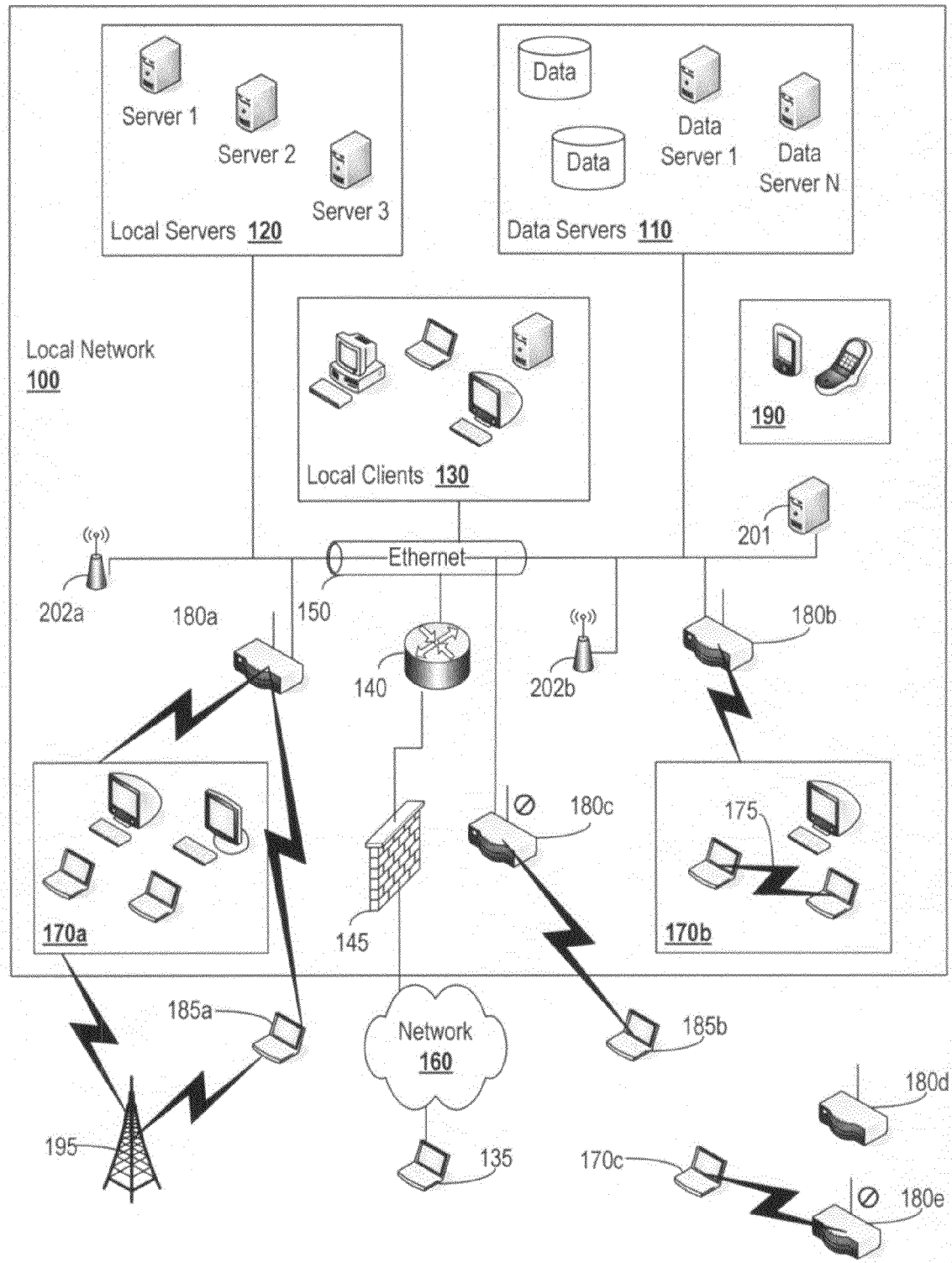
FIG. 1 illustrates an exemplary embodiment of a local network including both wired and wireless components, and a sensor and server for monitoring the wireless components.
Figure 2:
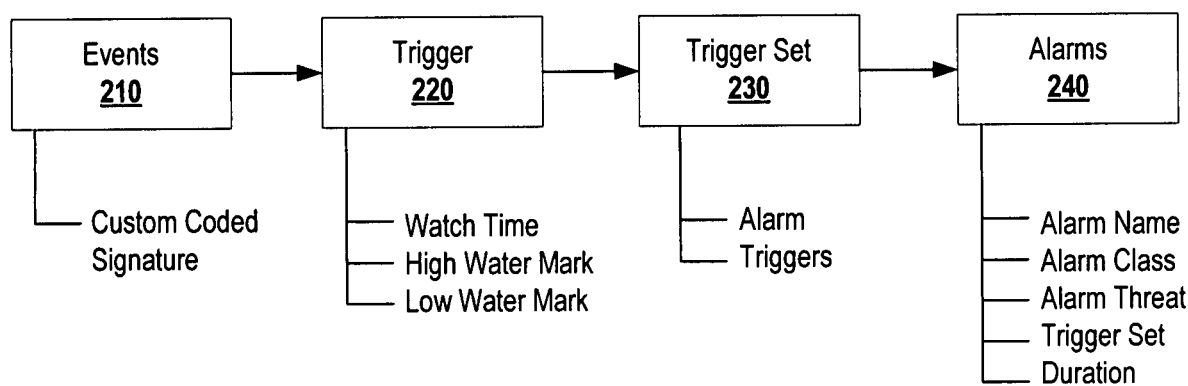
FIG. 2 illustrates a grouping of events into triggers which are grouped into trigger sets for each alarm.

Referring to FIG. 2, in an exemplary embodiment of the present disclosure, events 210 are classified into triggers 220 to minimize false positives. Triggers 220 are grouped into trigger sets 230. The trigger set 230 can include one or more triggers 240. When all triggers 220 in a trigger set 230 are above a certain threshold (i.e., a high water mark), then an alarm 240 is raised by the system. Alternatively, when a trigger 220 is set to high, a corresponding alarm 240 can be raised by the system in an embodiment where triggers 220 correlate directly to alarms 240.

In an exemplary embodiment of the present disclosure, the server 201 is configured to receive multiple events 210 from the sensors 202a, 202b distributed in the enterprise. Events 210 are generated every period, such as every minute. Custom coded signatures correspond to each event 210, and further each event 210 can be semantically defined. When a signature is met, the event is raised 210. At the end of every period, all events 210 are reset. Examples of events 210 can include an encryption violation, authentication violation, keygen violation, unauthorized rogue AP, and the like.

The trigger 220 is configured to minimize false positives associated with multiple events 210. Each received event 210 is correlated to one or more triggers 220. The triggers 220 include the following configurable parameters: watch time, high water mark, and low water mark. The watch time is the period length in which events 210 are examined, such as one minute. The high water (HW) mark is the number of events 210 in the watch time above which a trigger 220 transitions from low to high. The low water (LW) mark is the number of events 210 in the watch time below which a trigger 220 transitions from high to low. For example, the high water mark can be more than three events 210 in one period to cause the trigger 220 to be set high from low, and the low water mark can be one or less events 210 in one watch time period to cause the trigger 220 to be set low from high. Triggers can include a count of the number of events received in the watch period, and the trigger count can be represented by an event bit mask for a period, such as 32 minutes. Examples of triggers 220 can include privacy encryption violation, identification theft, unauthorized rogue AP, WLAN Jack signature, and the like. Triggers 220 can be tracked for every event 210, and each trigger 220 relates to a specific device.

Triggers 220 can be grouped into trigger sets 230 which allow alarms 240 to be tuned through a configuration file. Every trigger 220 in a trigger set 230 must be high for the trigger set 230 to activate its alarm 240. Alternatively, triggers 220 can directly activate alarms 240. The trigger set 230 includes the alarm 240 which it is set to activate and a collection of triggers 220 which all must be high to activate the alarm 240, or all must be low to deactivate the alarm 240 after a duration period, assuming there is no user input to clear the alarm 240. The trigger set 230 can include one trigger 220 or multiple triggers 220.

The trigger sets 230 generate alarms 240 which can be queried by reporting, notifications, and GUI components of the present disclosure. If all the triggers 220 in a specific trigger set 230 go high, the trigger set's 230 corresponding alarm 240 becomes active, and stays active at least until duration minutes after the trigger set 230 goes low. Alternatively, if the alarm 240 corresponding to the trigger set 230 is already active, then the alarm 240 remains active as long as the trigger set 230 is high plus the duration time after the trigger set 230 goes low. Examples of trigger sets 230 can include a privacy violation: encryption trigger set 230 which includes one trigger 220 for privacy encryption violation, and a WLAN Jack trigger set 230 which includes a trigger 220 for identification theft and a trigger 220 for WLAN Jack signature.

In an exemplary embodiment of the present disclosure, triggers 220 mean an alarm event occurred in the observed period. All triggers 220 in excess of the high water mark in a trigger set 230 over a period of time results in the generation of an alarm 240. In the various exemplary embodiments of the present disclosure, triggers 220, trigger sets 230, and alarms 240 each include multiple configurable parameters. These parameters can be user-configurable (e.g., through a configuration file, through a GUI, and the like) or pre-configurable.

The events 210 include configurable custom coded signatures. The triggers 220 each include a configurable watch time, high water mark, and low water mark. The trigger sets 230 each include the corresponding alarm 240 and the collection of triggers 220 in the trigger set 230. In the trigger set 230, both the corresponding alarm 240 and collection of triggers 220 are configurable. Finally, each alarm 240 includes a configurable alarm name, alarm class (e.g., policy type, performance type, etc.), alarm threat (e.g., threat contribution high and threat contribution increment as described herein), trigger set, and the duration period which is the amount of time the alarm 240 remains active after all the one or more triggers goes low.

Figure 3A:
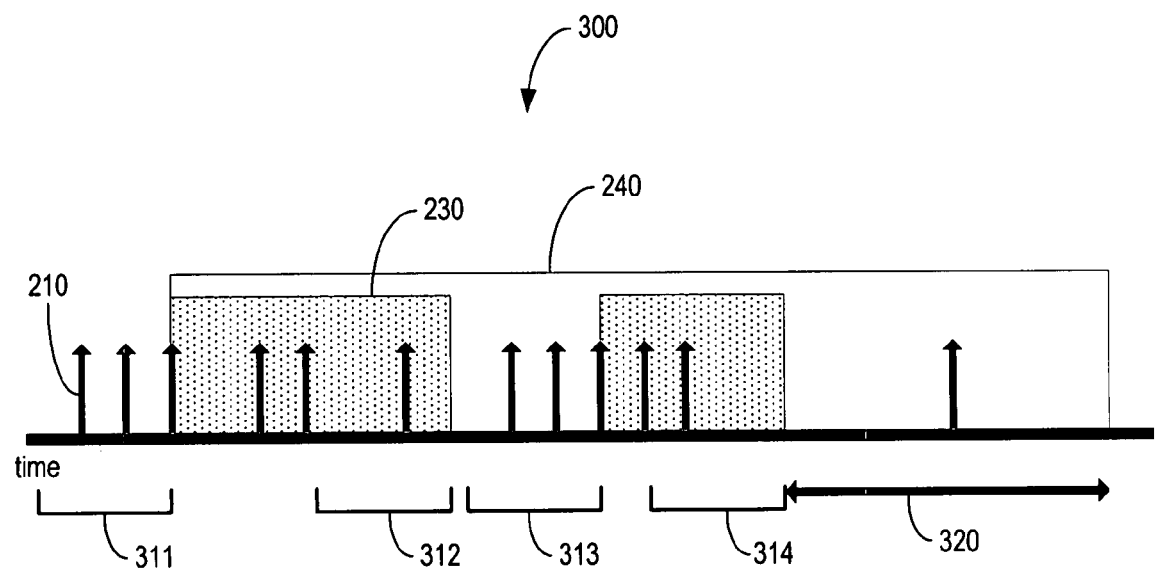
FIGS. 3a and 3b illustrate generating an alarm with exemplary scenarios depicting a single trigger set containing a single trigger.
Figure 3B:
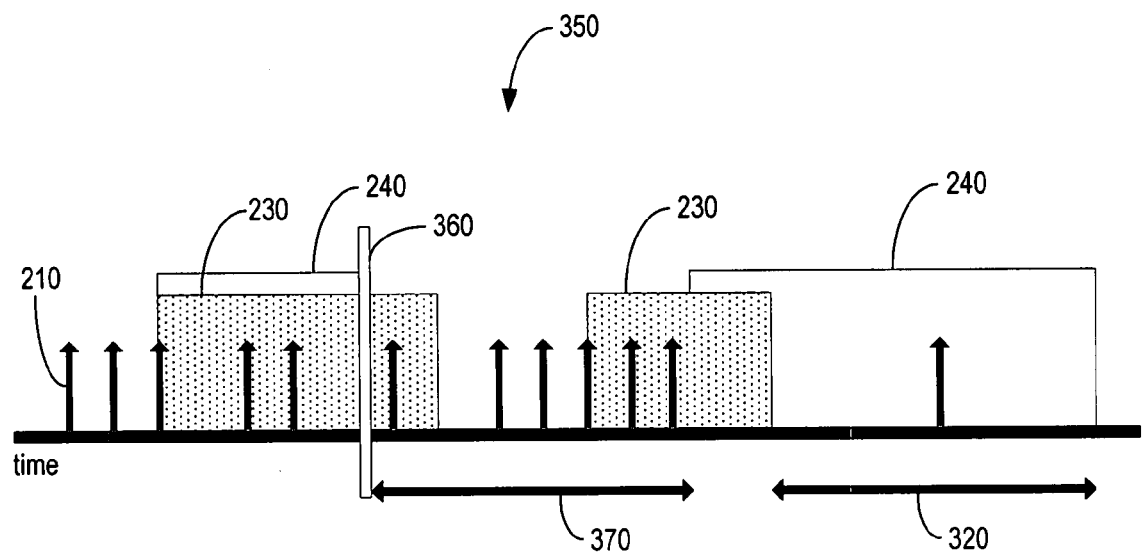

Referring to FIGS. 3a-3b, exemplary scenarios 300 and 350 depicting a single trigger set 230 containing a single trigger 220 are illustrated for generating an alarm 240. As described herein, the trigger 220 includes a watch time period (e.g., one minute) during which events 210 are examined, a high water mark (e.g., three events 210) which determines when the trigger 220 transitions from low to high, and a low water mark (e.g., one event 210) determines when the trigger 220 transitions from high to low. Both scenarios 300 and 350 illustrate the same events 210 received over time.

In FIG. 3a, during time period 311, the number of events 210 exceeds the high water mark of the trigger 220, resulting in the trigger 220 going high. Since the one trigger 220 in the trigger set 230 is high, the corresponding alarm 240 is set active. During time period 312, the number of events 210 goes below the trigger 220 low water mark, and accordingly, the trigger 220 is set low. However, the alarm 240 still remains active despite the trigger 220 being set low because of a duration time 320 associated with the alarm 240. The duration time 320 maintains the alarm 240 as active for a predetermined time following the trigger 220 becoming low.

During time period 313, the number of events 210 once again exceeds the high water mark, and the trigger 220 is set to high. However, the alarm 240 is unaffected because it is already active at this point. Effectively, this extends the duration period 320 when the alarm 240 is active. During time period 314, the trigger 220 goes low again due to the number of events 210 received in the time period 314 being below the low water mark. After the duration period 320 expires, the alarm 240 is deactivated. Advantageously, scenario 300 includes twelve events 210 and two high-to-low transitions, but a user would only see a single alarm 240.

In FIG. 3b, scenario 350 includes the same events 210, trigger 220, and trigger set 230 as in scenario 300 in FIG. 3a. In FIG. 3b, a user clears the alarm 240 with an alarm clear 360. In various exemplary embodiments of the present disclosure, alarms 240 are user editable while they are active. Any such user edits are auditable for content and user. Once an alarm 240 is inactive, users cannot edit the alarm 240. For example, alarms 240 can include a note field, alarm extension, and alarm clear which are editable by the user. The note field includes text which can describe the alarm, actions taken, and the like. The alarm extension allows the user to extend the end time of the alarm 240 to allow more time to handle it and interact with the system. The alarm clear allows the user to clear an alarm 240, and optionally to specify a time for which the alarm 240 is to remain deactivated (either for a device or for the system).

In FIG. 3b, the user is shown activating the alarm clear 360 in the midst of the alarm 240. Accordingly, the alarm 240 is deactivated despite the trigger 220 remaining above the high water mark. The alarm 240 remains deactivated for a clear time 370. The clear time 370 can be predetermined or user-defined. After the clear time 370 expires, and the trigger 220 is still high, the alarm 240 is again activated and remains activated until the trigger 220 goes low and the duration time 320 expires.

Figure 4:
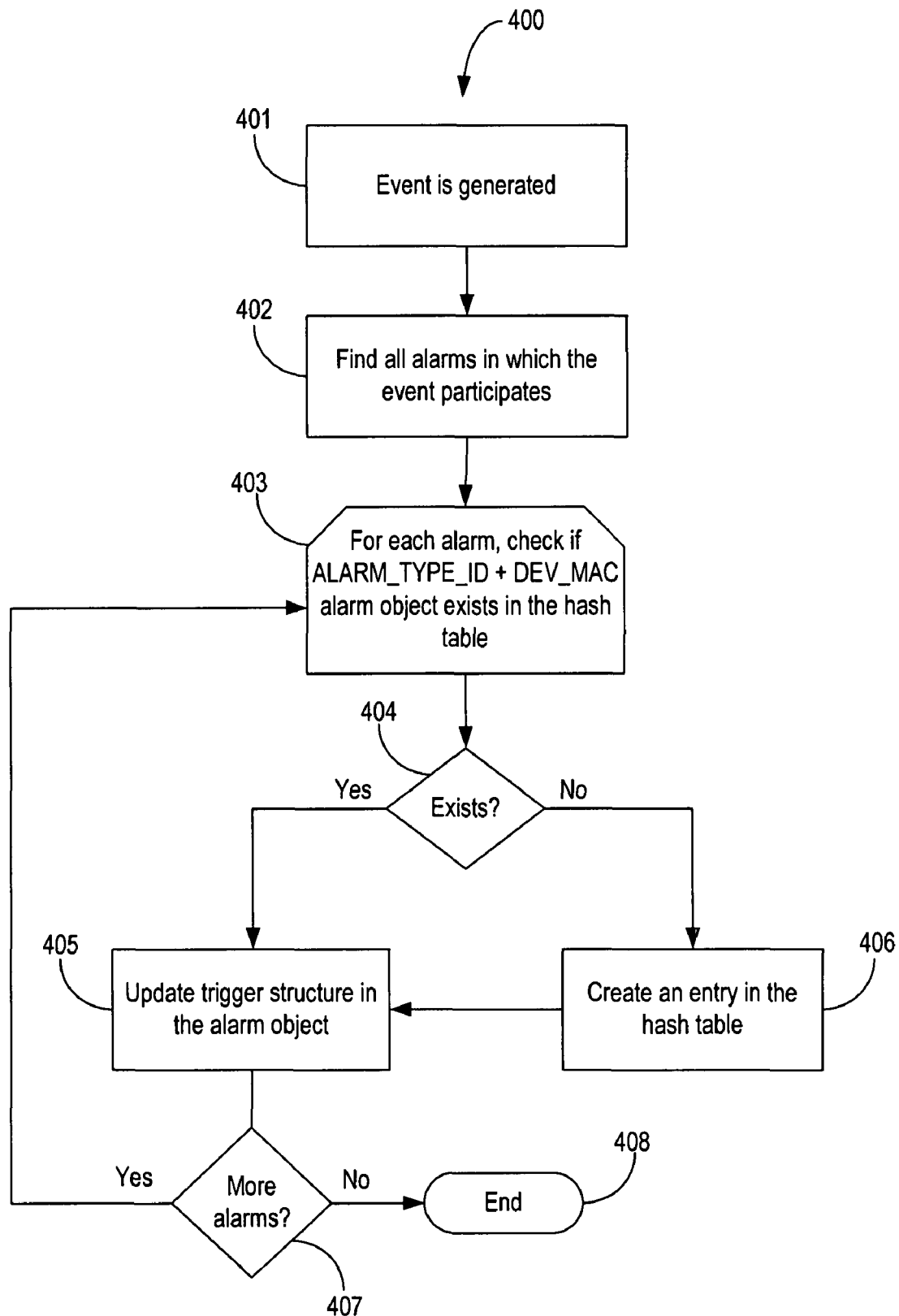
FIG. 4 illustrates a flowchart depicting an exemplary operational scenario for handling events.

Referring to FIG. 4, a flowchart illustrates operational scenario 400 for handling events, according to an exemplary embodiment of the present disclosure. As described herein, the server 201 is configured to receive and correlate data, events, and statistics from the sensors 202a, 202b. In this exemplary embodiment, events are managed utilized an alarm hash table. There is an alarm object entry for each alarm for each device, and this entry is modified as events are received. The modification updates the alarm object with the current event count. All triggers and trigger sets in the alarm object which can be queried from alarm hash table. In other methods described herein, alarms are generated based upon the current alarm object in the alarm hash table. Advantageously, hash tables allow efficient storage and retrieval of triggers, trigger sets, and alarms and the corresponding associated events.

An event is generated (step 401). The event is based upon the monitoring of the wireless network by the sensors 202a, 202b and the analysis of the received data, events, and statistics by the server 201. After the event is generated, all the alarms in which the event participates are found (step 402). Here, the configuration is utilized to determine which events, triggers, trigger sets, and alarms the corresponding event is included in. Utilizing the hash table, an ALARM_TYPE_ID+DEV_MAC alarm object is checked for each alarm to see if the alarm object exists (step 403). The ALARM_TYPE_ID identifies the alarm type, and the DEV_MAC corresponds to the device media access control (MAC) which identifies the device based upon MAC address. Here, the hash table includes objects for each device and for each alarm type for each device.

In step 404, scenario 400 determines whether the alarm object exists for the ALARM_TYPE_ID+DEV_MAC. If it exists, then the trigger structure is updated in the alarm object in the alarm hash table (step 405). If the object does not exist, then an entry is created in the alarm hash table (step 406), and the trigger structure is updated in the alarm object in the alarm hash table (step 405). In an exemplary embodiment, updating the alarm object in the alarm hash table can include incrementing a value to denote the generation of the event. If the event participates in more alarms, then the scenario 400 repeats steps 403, 404, 405, and 406 for each of the other alarms (step 407). If all alarms have been updated, then the scenario 400 ends (step 408).

Figure 5:
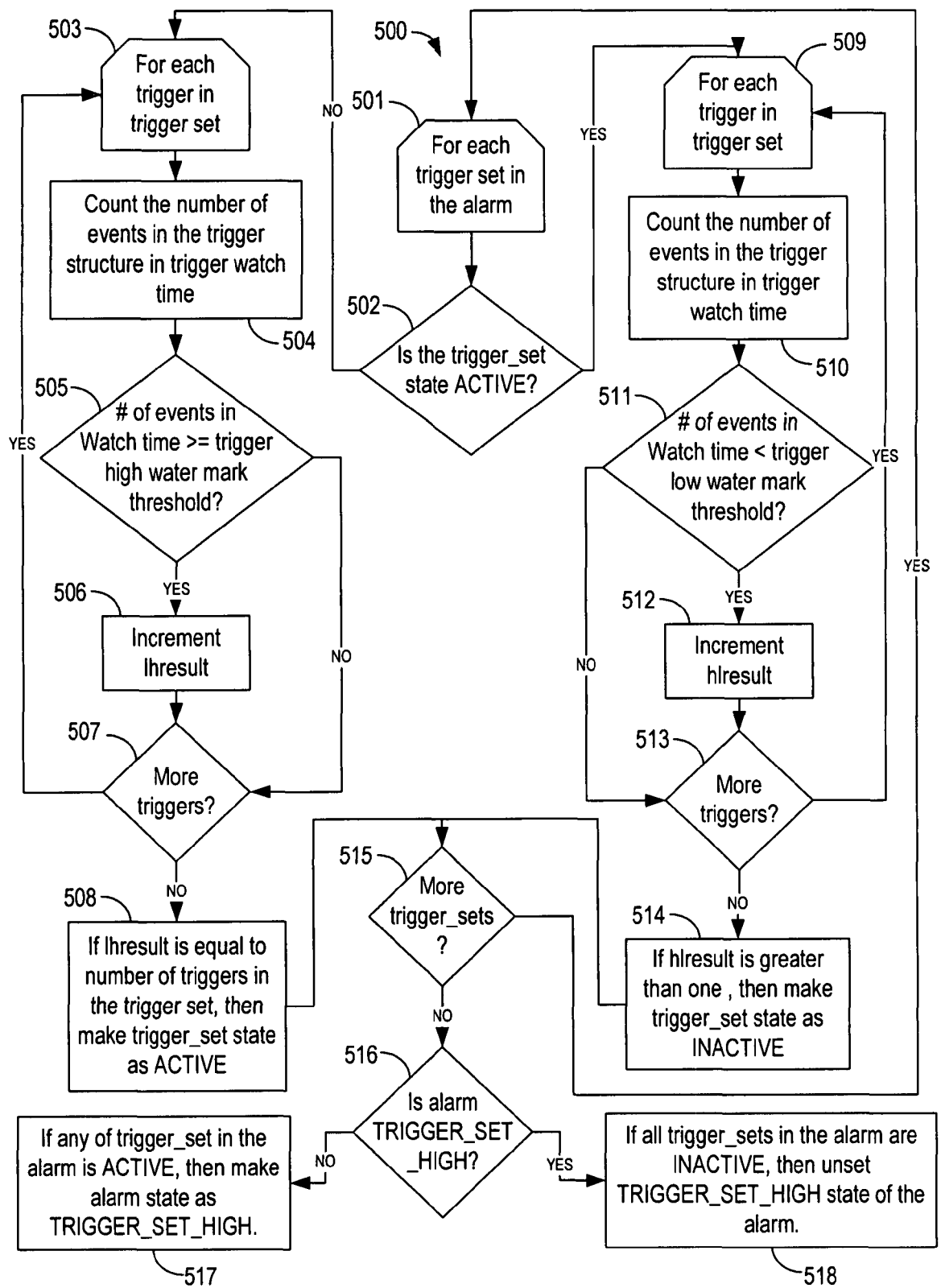
FIG. 5 illustrates a flowchart depicting an exemplary operational scenario for generating alarms.

Referring to FIG. 5, a flowchart illustrates operational scenario 500 for generating alarms, according to an exemplary embodiment of the present disclosure. Scenario 500 is implemented on each alarm object in the alarm hash table every period, such as each minute. As described herein, the state of the trigger set is ACTIVE when all of the triggers in the trigger set are above the high water mark, and the trigger set is INACTIVE when at least one of the triggers is below the low water mark. A variable, lhresult, is used to track the number of triggers above the high water mark in a trigger set, and a variable, hlresult, is used to track the number of triggers below the low water mark in a trigger set.

For each trigger set in the alarm object (step 501), the ACTIVE state of the trigger set is determined (step 502). If the ACTIVE state of the trigger state is not active in step 502, then for each trigger in the trigger set (step 503), the number of events in the trigger structure is counted over the trigger watch time (step 504). If the number of events is greater than or equal to the trigger high water mark threshold over the trigger watch period (step 505), then lhresult is incremented by one (step 506). If there are more triggers in the trigger set (step 507), then steps 503 through 506 are repeated.

After completing steps 503 through 506 for all the triggers, if lhresult is equal to the number of triggers in the trigger set, then the trigger set state is set to ACTIVE (step 508). Here, the lhresult tracks the number of triggers in the trigger set above the high water mark threshold, and if lhresult equals the number of triggers in the trigger set, then all triggers are above the high water mark.

If the ACTIVE state of the trigger state is active in step 502, then for each trigger in the trigger set (step 509), the number of events in the trigger structure is counted over the trigger watch time (step 510). If the number of events is less than the trigger low water mark threshold over the trigger watch period (step 511), then hlresult is incremented by one (step 512). If there are more triggers in the trigger set (step 513), then steps 509 through 512 are repeated.

After completing steps 509 through 512 for all the triggers, if hlresult is greater than one, then the trigger set state is set to INACTIVE (step 514). Here, the hlresult tracks the number of triggers in the trigger set below the low water mark threshold, and if hlresult is greater than one, then one or more triggers in the trigger set are below the low water mark.

If there are more trigger sets associated with the alarm (step 515), then steps 501 through 514 are implemented for each of the trigger sets. A variable, TRIGGER_SET_HIGH, can be used to track the state of the alarm object. If TRIGGER_SET_HIGH is active, then the alarm object is active. If the alarm TRIGGER_SET_HIGH is not active (step 516), then if any of the trigger sets in the alarm are active, make the TRIGGER_SET_HIGH active as the alarm state (step 517). If the alarm TRIGGER_SET_HIGH is active (step 516), then is all trigger sets in the alarm are inactive, unset the TRIGGER_SET_HIGH state of the alarm (step 518).

Accordingly, scenario 500 will adjust the TRIGGER_SET_HIGH state for each of the alarm objects in the alarm hash table every period. Advantageously, fewer alarms are generated utilizing the triggers and trigger sets of the present disclosure.

Figure 6:
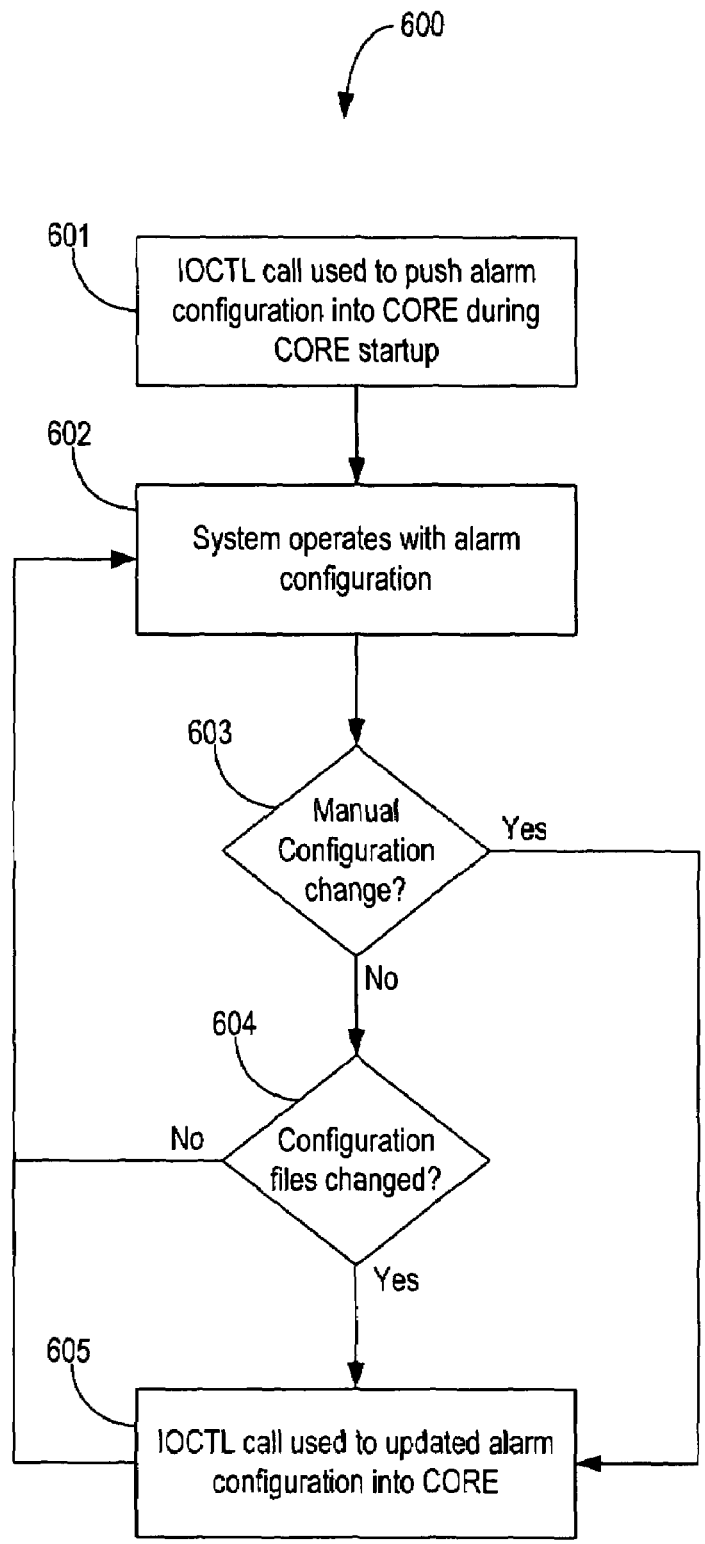
FIG. 6 illustrates a flowchart depicting an exemplary operational scenario for managing the alarm configuration.

Referring to FIG. 6, a flowchart illustrates operational scenario 600 for managing the alarm configuration, according to an exemplary embodiment of the present disclosure. As described herein, events, triggers, trigger sets, and alarms each include multiple configurable parameters. These parameters can be user-configurable (e.g., through a configuration file, through a GUI, and the like) or pre-configurable. Scenario 600 illustrates an exemplary update of the alarm configuration utilizing a configuration file.

An IOCTL call is used to push the alarm configuration into the CORE during the CORE startup (step 601). All frame processing, event generation, alarm generation and management and forensics collection is done in the CORE. The IOCTL call pushes a configuration file, such as an extensible markup language (XML) configuration file, into the system. The system operates with the alarm configuration (step 602). A manual configuration change can be implemented (step 603) anytime, such as through a user request. In this case, the IOCTL call is used to update the alarm configuration in the CORE (step 605). Periodically, an XML configuration engine will call CORE to check for configuration changes (step 604), and if so the IOCTL call is used to update the alarm configuration in the CORE (step 605). In an exemplary embodiment, configuration files are XML-based, and the configuration can be store in different files, such as alarm_configuration.xml, core_specific.xml, policyconfig.xml, performanceconfig.xml, apconfig.xml, etc.

Figure 7A:
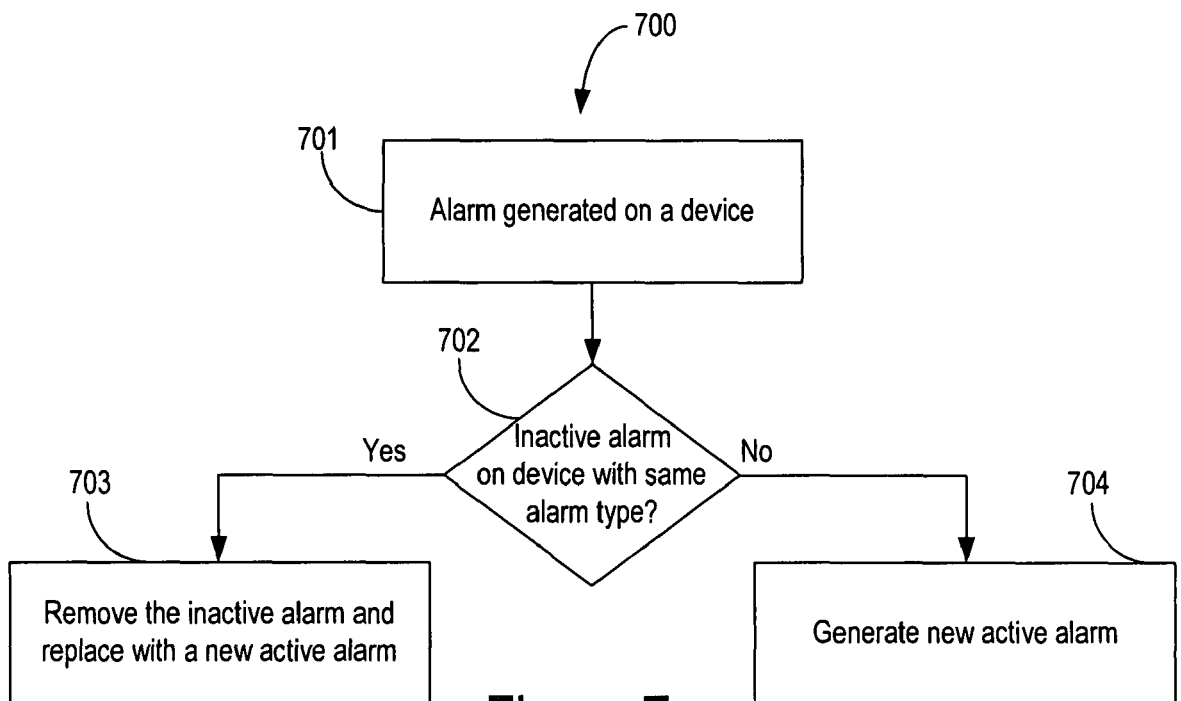
FIGS. 7a and 7b illustrate flowcharts depicting exemplary operational scenarios for handling active and inactive alarms.
Figure 7B:
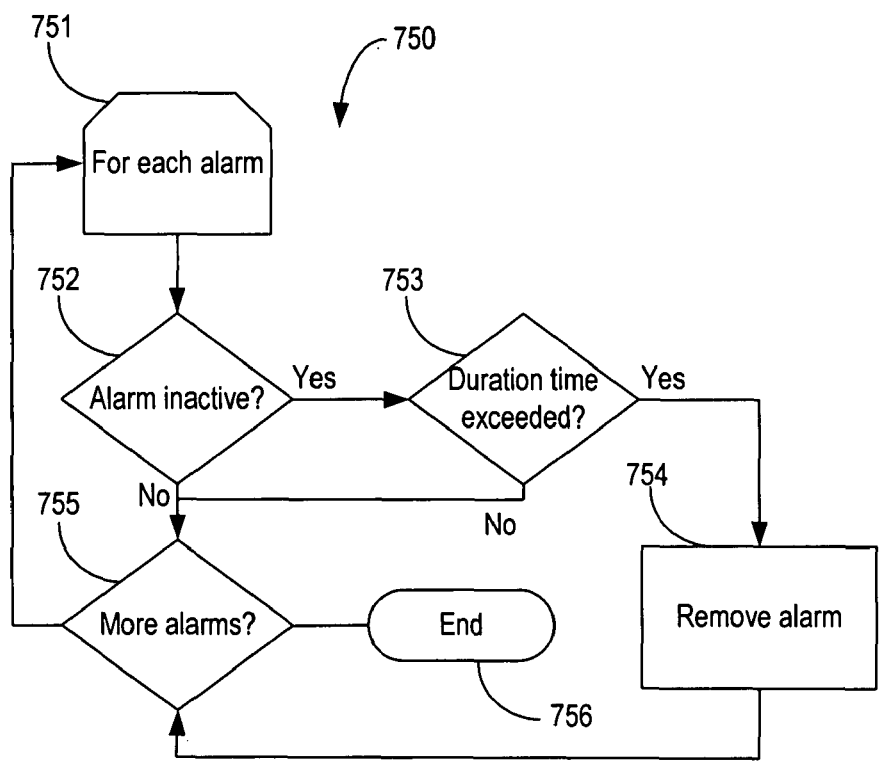

Referring to FIGS. 7a and 7b, flowcharts illustrate operational scenarios 700 and 750 for handling active and inactive alarms, according to an exemplary embodiment of the present disclosure. Scenario 700 handles generating active alarms. An alarm is generated on a device in the wireless network (step 701). The device corresponds to an element in the wireless network, such as a WLAN card, access point, Bluetooth device, and the like. Scenario 700 checks to see if there is an inactive alarm which exists for the device with the same alarm type (step 702). If not, then a new active alarm is generated (step 704). If there is an inactive alarm, then it is removed and replaced with a new active alarm (step 703).

Scenario 750 handles removing inactive alarms. For each alarm (step 751), the system checks the alarm to determine if it is inactive (step 752). If the alarm is inactive, the duration time is checked to see if it has been exceeded (step 753). As described herein, the duration time is the length of time the alarm remains on the system after the one or more of the triggers are below the low water mark. If the duration time is exceeded, then the inactive alarm is removed (step 754). If the duration time is not exceeded or if the alarm is not inactive, then if there are more alarms (step 755), scenario 750 repeats steps 751 through 754 for each of the remaining alarms.

Figure 8:
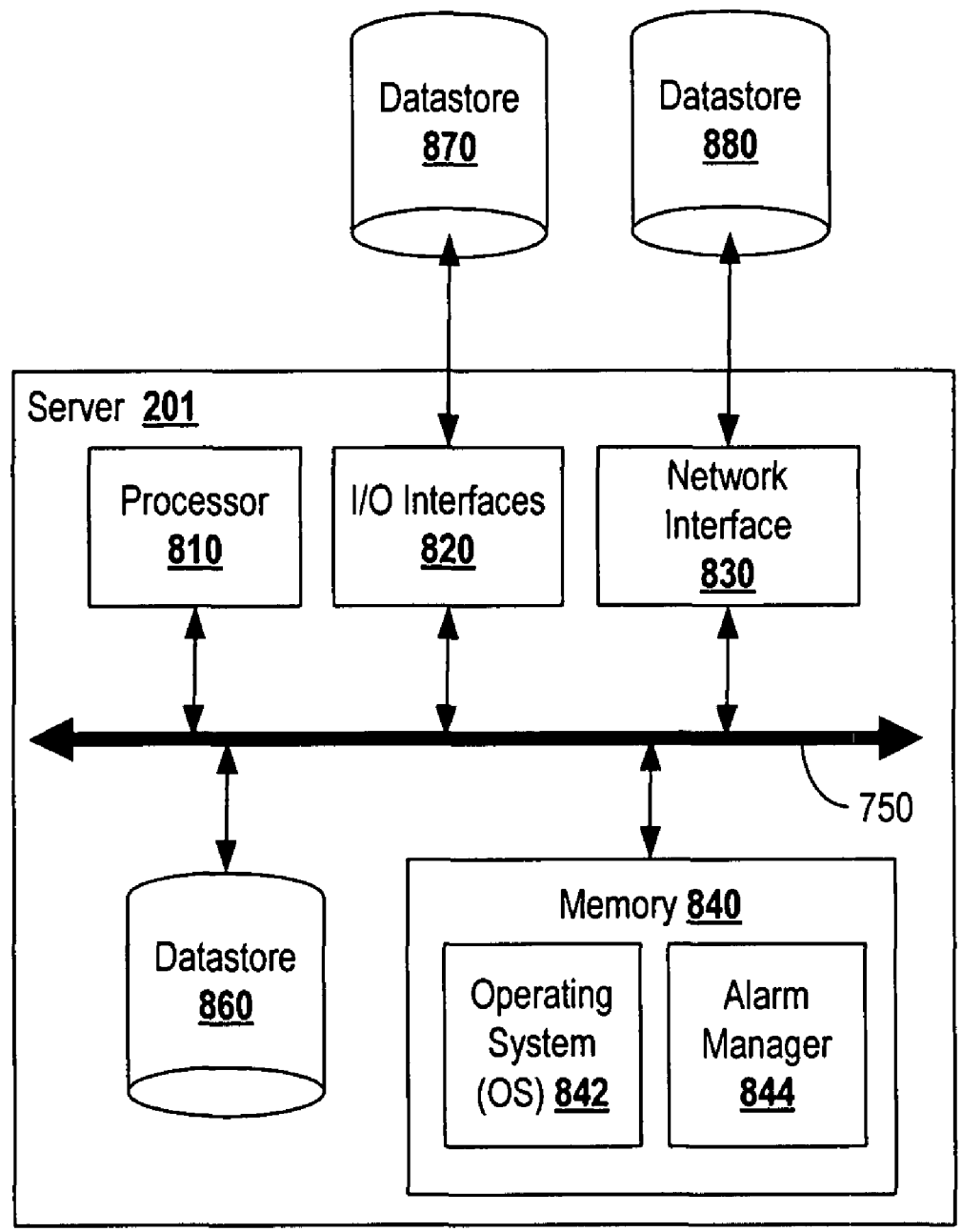
FIG. 8 illustrates a block diagram of a server having an alarm manager.

Referring to FIG. 8, a block diagram illustrates a server 201 having an alarm manager 844, according to an exemplary embodiment of the present disclosure. The server 201 can be a digital computer that, in terms of hardware architecture, generally includes a processor 810, input/output (I/O) interfaces 820, network interfaces 830, memory 840, and data store 860. The components (810, 820, 830, 840, and 860) are communicatively coupled via a local interface 850. The local interface 850 can be, for example but not limited to, one or more buses or other wired or wireless connections, as is known in the art. The local interface 850 can have additional elements, which are omitted for simplicity, such as controllers, buffers (caches), drivers, repeaters, and receivers, among many others, to enable communications. Further, the local interface 850 can include address, control, and/or data connections to enable appropriate communications among the aforementioned components.

The processor 810 is a hardware device for executing software instructions. The processor 810 can be any custom made or commercially available processor, a central processing unit (CPU), an auxiliary processor among several processors associated with the server 201, a semiconductor-based microprocessor (in the form of a microchip or chip set), or generally any device for executing software instructions. When the server 201 is in operation, the processor 810 is configured to execute software stored within the memory 840, to communicate data to and from the memory 840, and to generally control operations of the server 201 pursuant to the software instructions.

The I/O interfaces 820 can be used to receive user input from and/or for providing system output to one or more devices or components. User input can be provided via, for example, a keyboard and/or a mouse. System output can be provided via a display device and a printer (not shown). I/O interfaces 820 can include, for example, a serial port, a parallel port, a small computer system interface (SCSI), an infrared (IR) interface, a radio frequency (RF) interface, and/or a universal serial bus (USB) interface.

The network interfaces 830 can be used to enable the server 201 to communicate on a network. The network interfaces 830 can include, for example, an Ethernet card (e.g., 10BaseT, Fast Ethernet, Gigabit Ethernet) or a wireless local area network (WLAN) card (e.g., 802.11a/b/g). The network interfaces 830 can include address, control, and/or data connections to enable appropriate communications on the network.

A data store can be used to store alarms, events, data, state, and statistics that the server 201 receives or analyzes from devices monitoring a wireless network. The data store can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the data store may incorporate electronic, magnetic, optical, and/or other types of storage media.

In one example, the data store 860 can be located internal to the server 201 such as, for example, an internal hard drive connected to the local interface 850 in the server 201. Additionally in another embodiment, the data store 870 can be located external to the server 201 such as, for example, an external hard drive connected to the I/O interfaces 820 (e.g., SCSI or USB connection). Finally in a third embodiment, the data store 880 may be connected to the server 201 through a network, such as, for example, a network attached file server.

The memory 840 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 840 may incorporate electronic, magnetic, optical, and/or other types of storage media. Note that the memory 840 can have a distributed architecture, where various components are situated remotely from one another, but can be accessed by the processor 810.

The software in memory 840 can include one or more software programs, each of which includes an ordered listing of executable instructions for implementing logical functions. In the example of FIG. 8, the software in the memory system 840 includes the alarm manager 844 and a suitable operating system (O/S) 842. The operating system 842 essentially controls the execution of other computer programs, such as the alarm manager 844, and provides scheduling, input-output control, file and data management, memory management, and communication control and related services. The operating system 842 can be any of Windows NT, Windows 2000, Windows XP, Windows Vista (all available from Microsoft, Corp. of Redmond, Wash.), Solaris (available from Sun Microsystems, Inc. of Palo Alto, Calif.), or LINUX (or another UNIX variant) (such as available from RedHat of Raleigh, N.C.).

The alarm manager 844 is a software program loaded in the memory 840 of the server 201 configured to generate, manage, and display alarms associated with monitoring a wireless network. With regards to generating alarms, the alarm manager 844 can be configured to receive events from the processor 810 and/or the network interface 830. Here, the processor 810 can generate events responsive to correlation and analysis of data received from various sensors. The network interface 830 can provide events which are generated by the various sensors. Upon receiving events, the alarm manager 844 can implement the operational scenarios 400, 500, 600, 700, and 750 described herein relating to events, triggers, trigger sets, and alarms.

The alarm hash table along with hash key can be stored in the memory 840 and/or in the data store 860. As described herein, the hash table includes alarm objects for each alarm type for each device, e.g. ALARM_TYPE_ID+DEV_MAC alarm object. A hash table is used to store and retrieve the structures using a key. The insertion and retrieval is done in constant CPU time. Additionally, other methods as are known to those of ordinary skill in the art can be utilized to store and manage events, triggers, trigger sets, and alarms.

In addition to generating alarms for wireless monitoring, the alarm manager 844 can be configured to manage and display alarms. With regards to managing alarms, the alarm manager 844 can store alarms, allow a user to clear alarms, handle active and inactive alarms, and provide forensic analysis on the alarms. In an exemplary embodiment, triggers can be maintained as bits for each device and collected by a forensic collection process. In this process, the following parameters can be stored, queried, analyzed, and displayed: alarm sequence number, alarm name, device MAC or number, alarm state, alarm start time, alarm end time, sensor MAC, basic service set (BSS) MAC, channel, signal strength, notes, and the like. U.S. patent application Ser. No. 11/276, 930, filed Mar. 17, 2006, entitled "Systems and Methods for Wireless Network Forensics", describes forensic analysis on wireless systems.

The alarm manager 844 can support the same queries on live and historical data (e.g., such as retrieved alarms from the data stores 860, 870, 880). In an exemplary embodiment, the following fields will be accessible for every alarm instance: alarm start/end times, trigger start/end times (for every trigger set), alarm details, cleared by user (e.g., true/false value), notes input by user, and last modifying user.

Additionally, the present disclosure provides a visual representation of alarms associated with monitoring a wireless network as well as dialogs for investigating/mitigating alarms, and configuring specific alarm types. The alarm manager 844 can be configured to display a graphical user interface and a mouse/keyboard can provide input to investigate, mitigate, and configure the alarms. For example, a monitor can display the visual representation of the alarms by attaching to the I/O interfaces 820, and a keyboard and mouse can also connect to the I/O interfaces 820 for user input.

Figure 9:
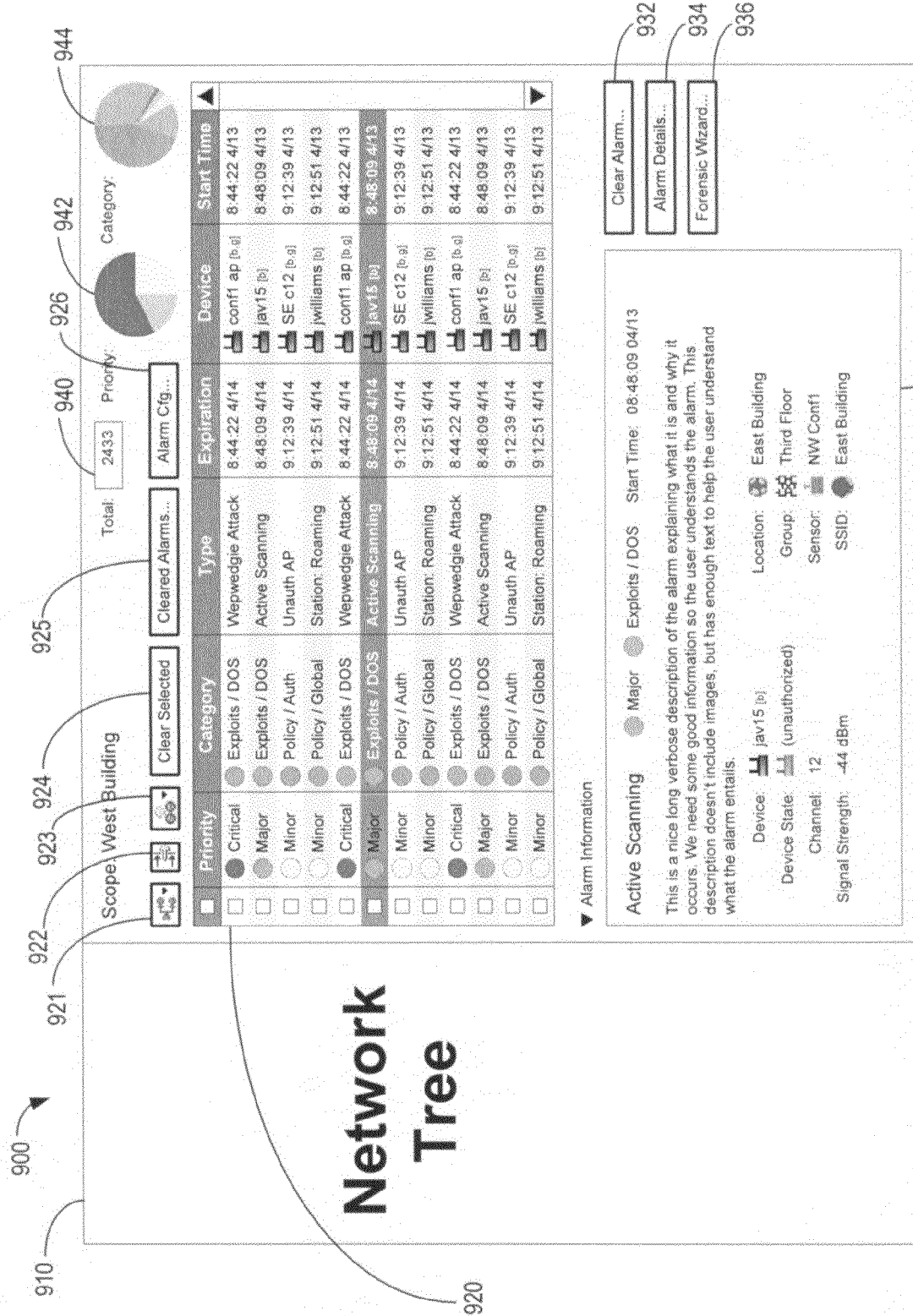
FIG. 9 illustrates an exemplary Alarm Manager panel.

Referring to FIGS. 9 through 14, various exemplary embodiments of the visual representation of alarms in a wireless network are illustrated. FIG. 9 illustrates an Alarm Manager panel 900 divided into several logical areas including a network tree 910, an alarm table 920, alarm information 930, and a network alarm total 940. The network tree 910 displays various devices grouped into logical groupings (i.e. network and sub-networks), such as APs, WLAN cards, and the like. The network tree 910 can be used to define the scope of alarms listed associated with a particular device, sub-network, etc.

The alarm table 920 shows basic information about the alarms in the wireless network. The data listed in the table 920 is limited by the current scope, group by selection, and filter. In this exemplary embodiment, the table 920 columns include priority (e.g., critical, major, minor, etc.), category (e.g., exploits/DOS (denial-of-service), policy/authentication or global, etc.), type (e.g. Wepwedgie attack, active scanning, unauthorized AP, station: roaming, etc.), expiration (i.e., date and time), device name, and start time. The table 920 columns can be reordered, and sorted by any column. Clicking on a particular entry in the table 920 can bring up alarm information 930 associated with the alarm.

The alarm information 930 shows detailed information about the selected entry in the alarm table 920. This information 930 can include a description of what the alarm is and why it occurs, and information 930 to allow a user to understand the alarm. Additionally, the information 930 can include the device name, device state, wireless channel, signal strength, physical location, sensor, and service set identification (SSID).

The network alarm total 940 provides a summary of the total alarm count in the wireless network. Additionally, a pie chart 942 illustrates the break down of the alarm total 940 by priority, and a pie chart 944 illustrates the break down of the alarm total by category. Advantageously, these components 940, 942, and 944 provide the user a snapshot of the current wireless network alarm state. Additionally, these components 940, 942, and 944 can also be based on the scope selected in the network tree 910 rather than the entire wireless network.

The Alarm Manager panel 900 also includes a group-by button 921, a filter button 922, a views button 923, a clear selected button 924, a cleared alarms button 925, an alarm configuration button 926, a clear alarm button 932, an alarm details button 934, and a forensic wizard button 936. The group-by button 921 allows the user to group the table 920 by alarm and device, alarm type, device, sensor, group, location, and the like. The clear selected button 924 clears the selected alarms in the table 920 either immediately or after requesting confirmation from the user, and this can be configurable. The forensic wizard button 936 launches a forensic wizard for the device, configured for the time period for which the alarm was active.

Figure 10:
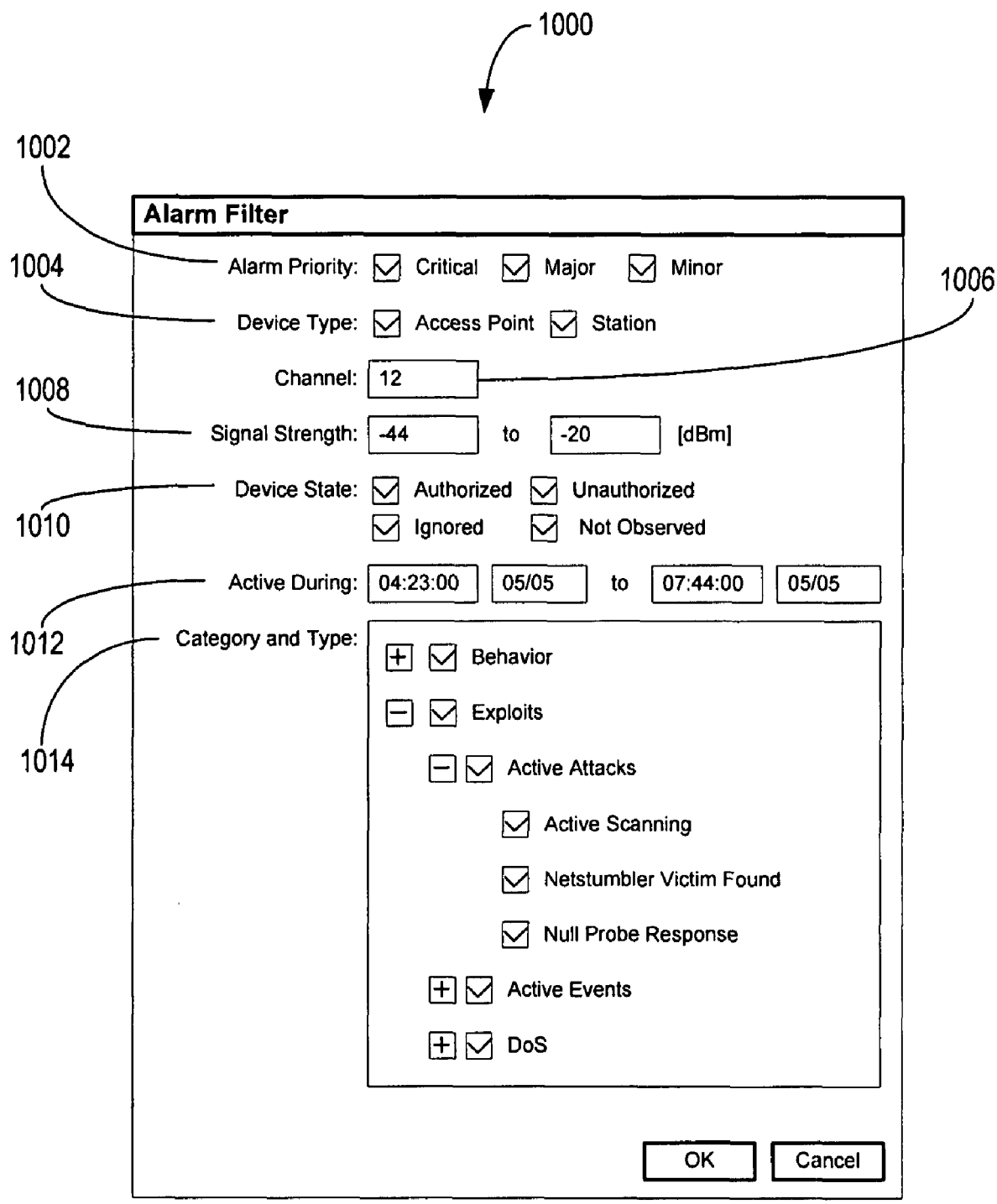
FIG. 10 illustrates an exemplary alarm filter panel which can be launched responsive to the filter button.

The filter button 922 launches a filter dialog which allows the user to configure a filter for limiting the entries in the alarm table 920. FIG. 10 illustrates an exemplary alarm filter panel 1000 which can be launched responsive to the filter button 922. The alarm filter panel 1000 includes an alarm priority check-box 1002, a device type check-box 1004, a channel selection 1006, a signal strength range selector 1008, a device state check-box 1010, an active during range selector 1012, and a category and type tree check-box 1014. The alarm priority check-box 1002 can filter alarms in the table 920 responsive to alarm priority, such as critical, major, minor, and the like.

The device type check-box 1004 can filter alarms responsive to the device type, such as access point, station, or the like. The channel section 1006 allows alarms to be filtered responsive to wireless channel, including IEEE 802.11 standard and non-standard proprietary channels. The device state check-box 1010 can filter alarms responsive to the state of the devices, such as authorized, unauthorized, ignored, not observed, and the like. The active during range selector 1012 can filter alarms responsive to the date and time range input. The category and type tree check-box 1014 allows alarms to be filtered based on the category and/or type of alarm.

Figure 11A:
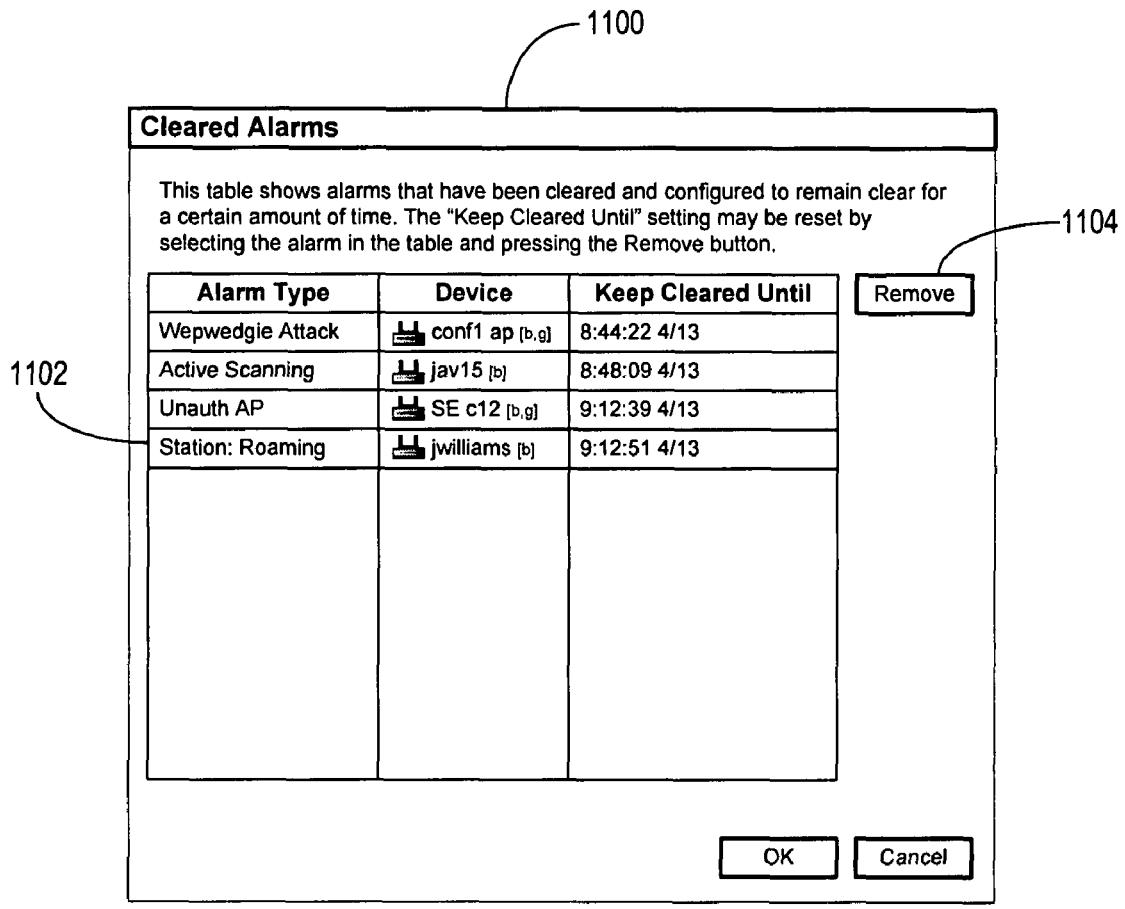
FIGS. 11a and 11b illustrate exemplary visualizations of a cleared alarms panel and a clear alarm dialog.

The cleared alarms button 925 launches a dialog from which the user can reset cleared alarm setting such as the time to keep cleared until. FIG. 11a illustrates an exemplary cleared alarms panel 1100 including an alarm table 1102 of the presently cleared alarms. The table 1102 lists the alarm type, device on which the alarm was cleared, and a time where the alarm will be kept clear until. The cleared alarms panel 1100 also includes a remove button 1104 which will remove the selected alarms in the table 1102 from the cleared alarm list. Further, the keep cleared until field can be editable by the user to change the date and time.

Figure 11B:
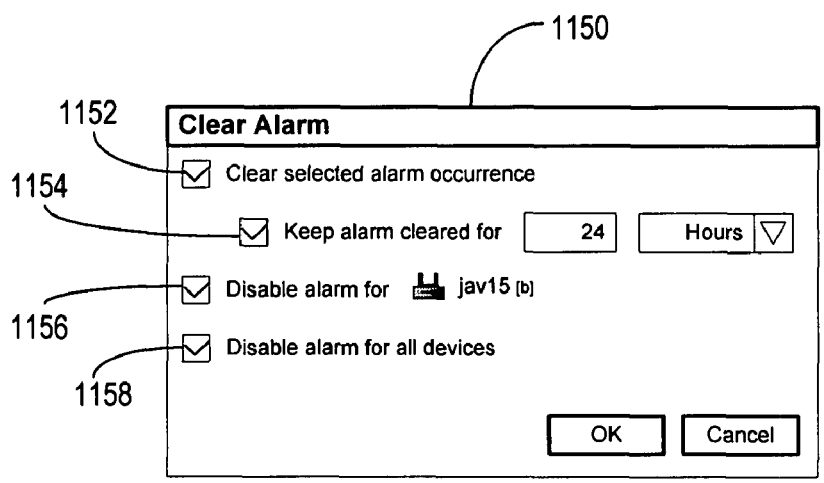

The clear alarm button 932 launches a clear alarm dialog which allows the user to clear or disable selected alarms. FIG. 11b illustrates an exemplary clear alarm dialog 1150 including a clear selected check-box 1152, a keep clear time selection 1154, a disable alarm check-box 1156, and a disable alarm for all check-box 1158. The clear selected check-box 1152 clears the selected alarm in the alarm table 920, and the keep clear time selection 1154 is the amount of the selected alarm is cleared for. The disable alarm check-box 1156 disables alarms for specific devices which can be selected from a pull-down menu or the like. The disable alarm for all check-box 1158 disables alarms for all devices.

Figure 12:
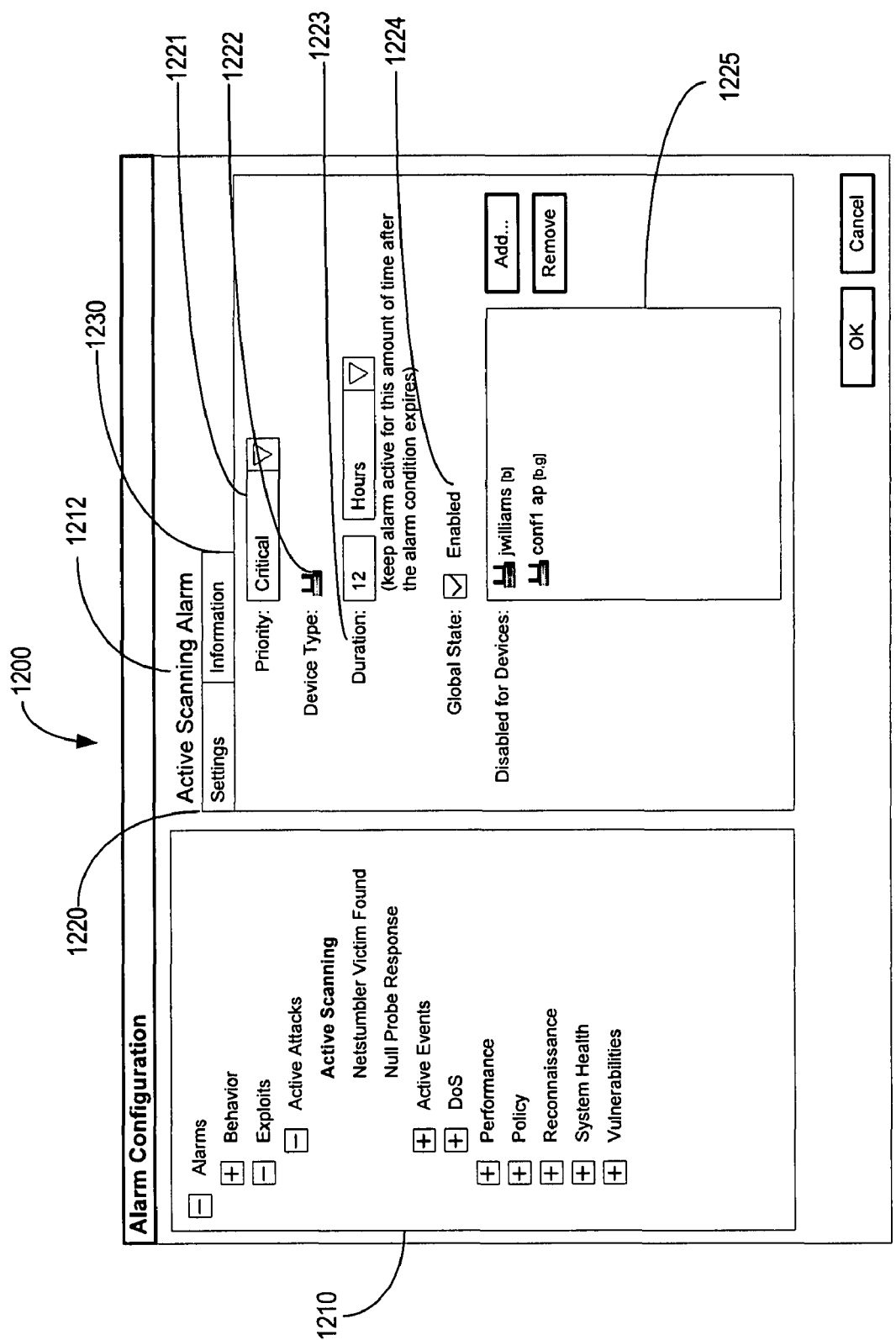
FIG. 12 illustrates the settings tab of the alarm configuration dialog.
Figure 13:
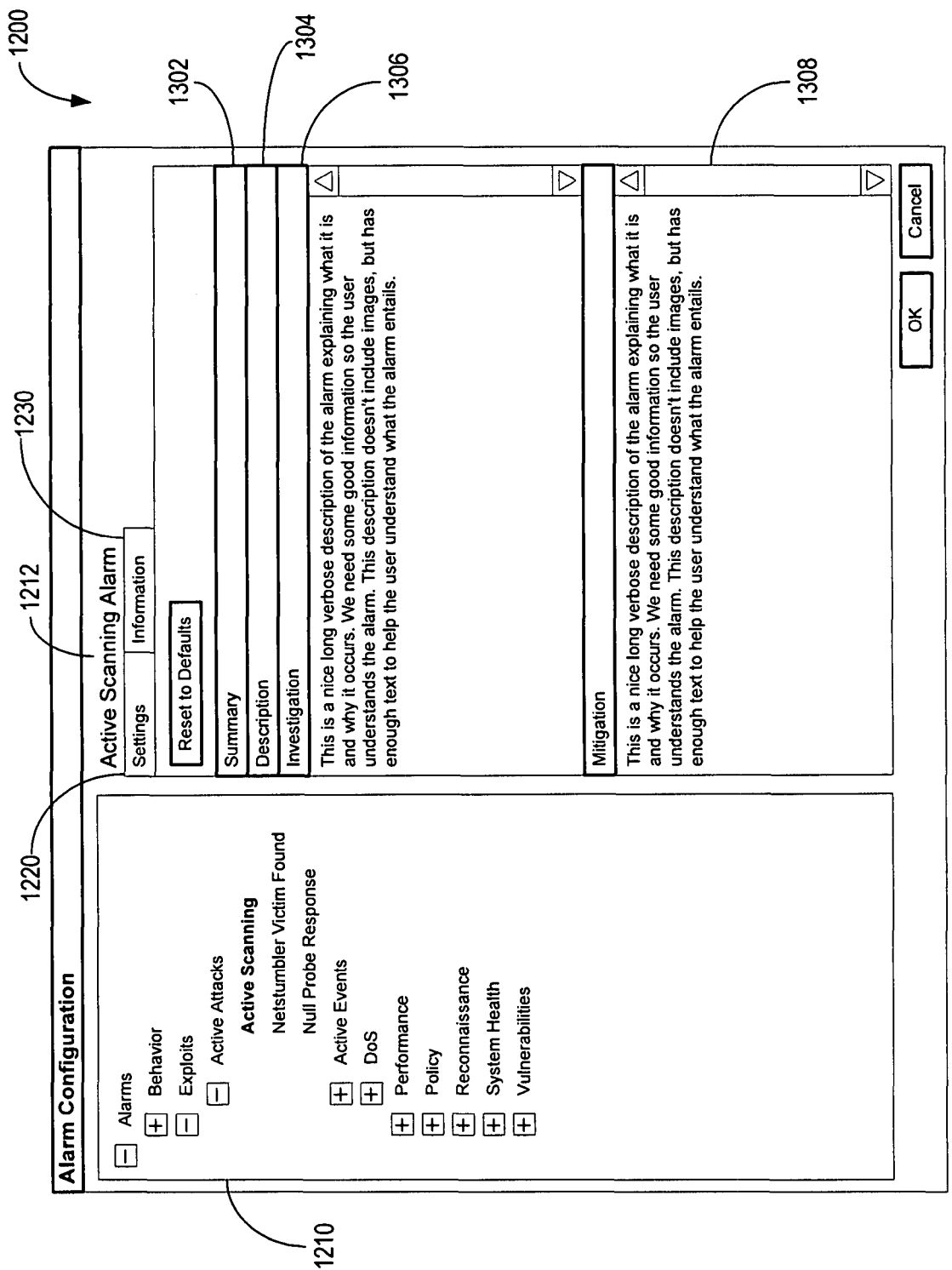
FIG. 13 illustrates the information tab of the alarm configuration dialog.

The alarm configuration button 926 launches an alarm configuration dialog which allows the user to configure settings for specific alarm types. FIGS. 12 and 13 illustrate an exemplary alarm configuration dialog 1200 including an alarm tree 1210, a settings tab 1200, and an information tab 1230. The alarm tree 1210 allows the user to select one or more alarms or alarm types. When selecting multiple alarms or an alarm type, settings can be change for all the selected alarms or alarms in the alarm type. For example, alarm types can include behavior, exploits, performance, policy, reconnaissance, system health, vulnerabilities, and the like. Examples of exploit type alarms can include active scanning, Netsumbler victim found, and null probe response.

FIG. 12 illustrates the settings tab of the alarm configuration dialog 1200. The settings tab 1220 allows the user to change alarm priority 1221, duration 1223, global state 1224, and device-specific state 1224. Also, a device indicator 1222 alerts the user to the types of devices in which the alarm applies. FIG. 13 illustrates the information tab 1230 of the alarm configuration dialog 1200. The information tab 1230 allows the user to view summary 1302, description 1304, investigation 1306, and mitigation 1308 information associated with the alarm. The four regions of the tabs 1302, 1304, 1306, and 1308 can be individually collapsed or expanded by clicking on the associated tabs.

Figure 14:
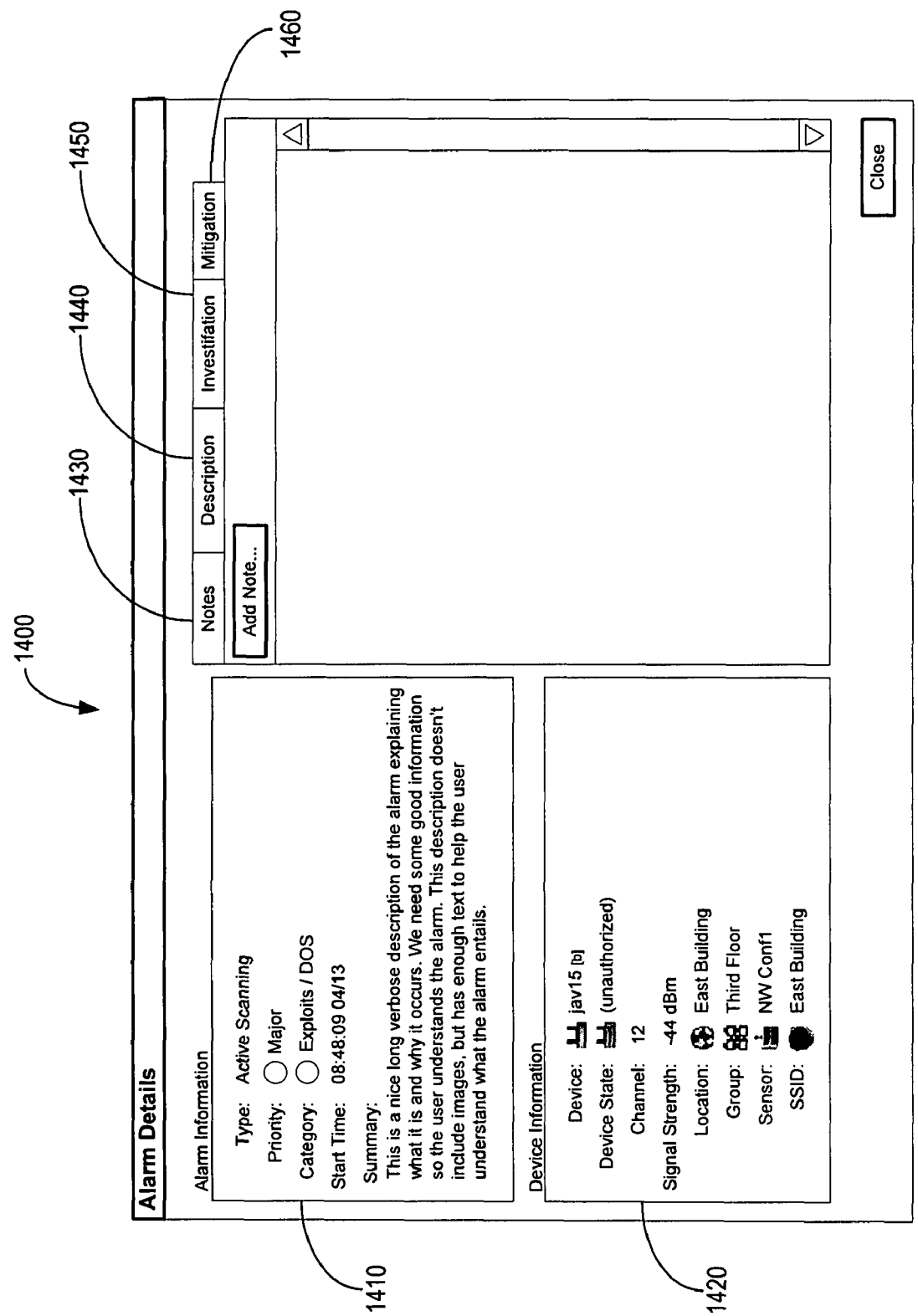
FIG. 14 illustrates an exemplary alarm details dialog.

The alarm details button 934 launches an alarm details dialog which shows all standard alarm and device information. FIG. 14 illustrates an exemplary alarm details dialog 1400 including an alarm information panel 1410, a device information panel 1420, an alarm notes tab 1430, a description tab 1440, an investigation tab 1450, and a mitigation tab 1460. The alarm information panel 1410 provides a summary of the alarm, such as the alarm type, priority, category, time, and summary. The device information panel 1420 provides a summary of the device which triggered the alarm, such as the device name, state, channel, signal strength, location, group, sensor, and SSID.

The tabs 1430, 1440, 1450, and 1460 include similar information as described in FIG. 13. The notes 1430 tab includes user-editable notes detailing the alarm. The description 1440 tab includes a detailed description of the alarm. The investigation tab 1450 includes investigation instructions associated with the alarm. The mitigation tab 1460 includes mitigation instructions associated with the alarm.

Figure 15:
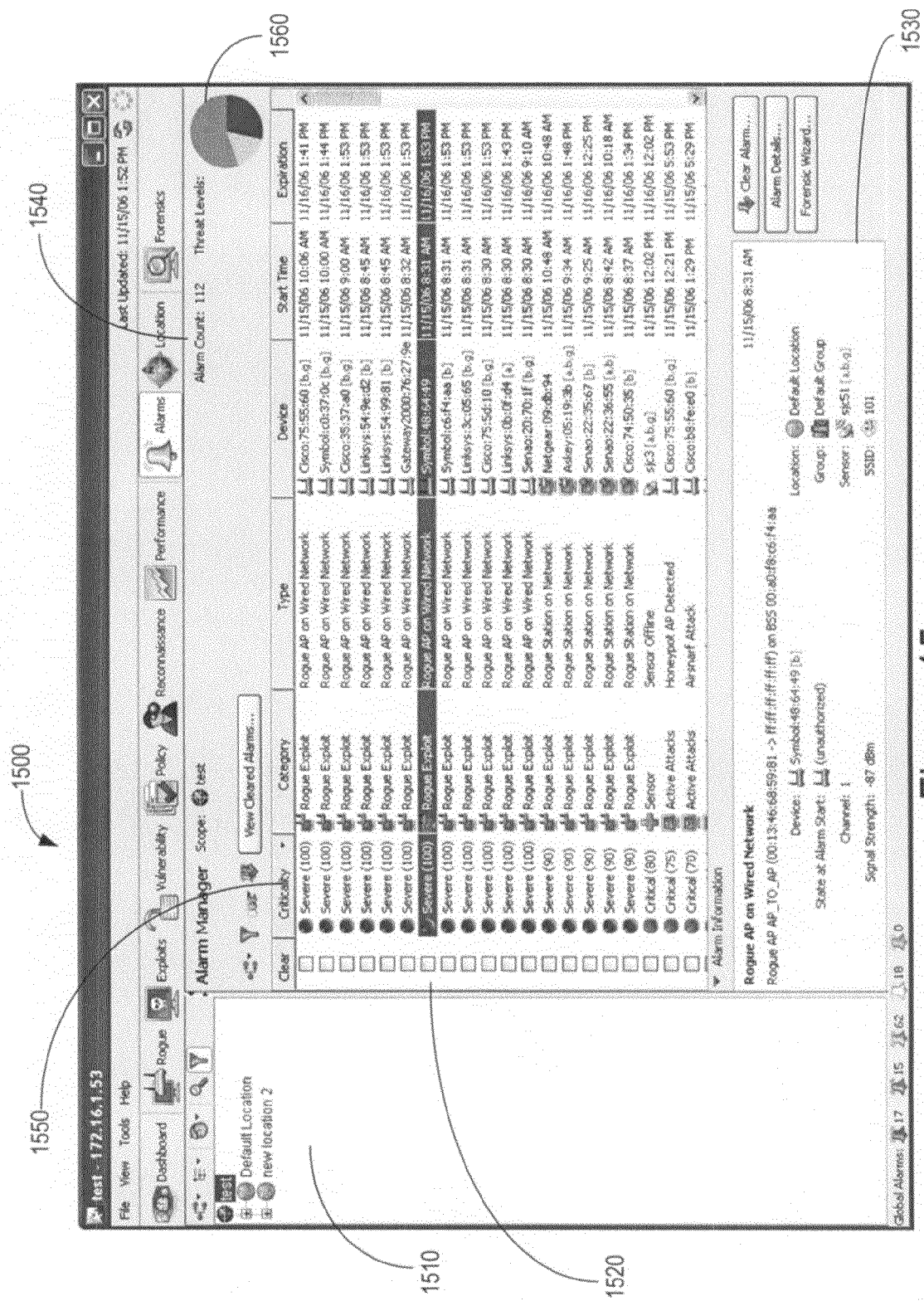
FIG. 15 illustrates another exemplary Alarm manager panel.

Referring to FIGS. 15-20, various exemplary embodiments of the visual representation of an alarm manager panel 1500 are illustrated. In FIG. 15, the alarm manager panel 1500 includes a network tree 1510, an alarm table 1520, alarm information 1530, and network alarm count 1540. Additionally, the alarm manager panel 1500 includes a criticality 1550 value for each alarm, and a threat level pie chart 1560. In an exemplary embodiment, the criticality 1550 includes a category, such as severe, critical, major, minor, etc., and a threat calculation. Every alarm type can have a configurable threat calculation. Defaults are defined, but they can all be user configured from 0 to 100. In the exemplary embodiments of FIGS. 15-20, these values are displayed in the alarm manager panel 1500, and can be used to filter alarms there. The threat level pie chart 1560 illustrates a graphical representation of the threat calculations for the alarms.

A threat index can be calculated for devices, groups, locations, and the overall network. The threat index can be global or filtered on an alarm class. For example, there can be a system-wide policy threat index associated with policy class alarms, or a group-wide threat index, or a single device's threat index. In an exemplary embodiment, the threat index is calculated using the following formula:

$$T = \mathrm{Min}\left(100, \mathrm{Max}(C) + \frac{\sum C - \mathrm{Max}(C)}{1 + (W \cdot D)}\right),$$

were T equals the threat index, C equals the criticality 1550 threat calculation of every active alarm in scope, and D equals the number of devices with active alarm in scope, and W is a constant factor used to weight incremental threat with the default as 20 and the ability to configure the value.

Figure 16:
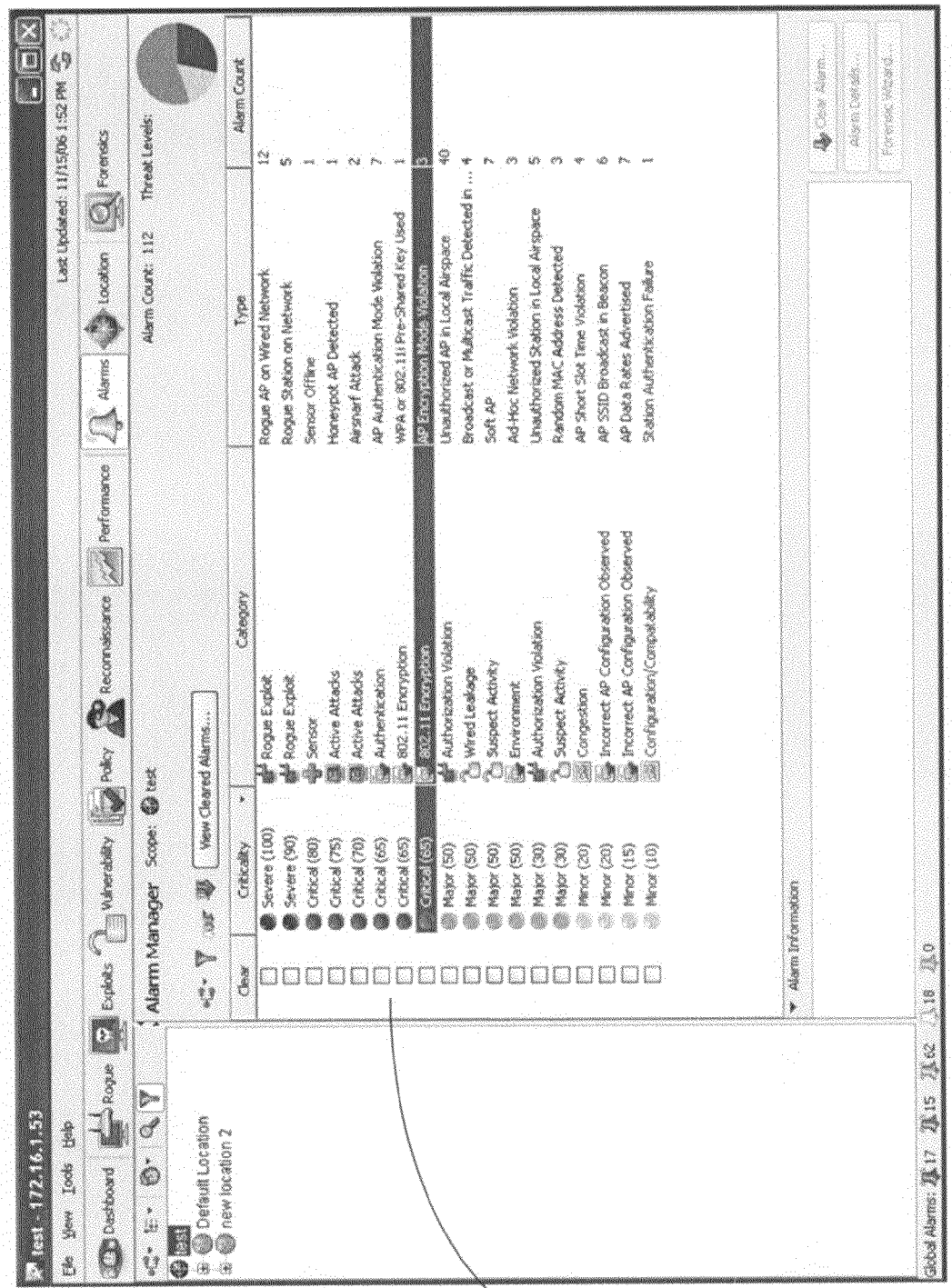
FIG. 16 illustrates an alarm manager panel with an alarm table filtered based upon alarm types, and sorted based upon criticality.
Figure 17:
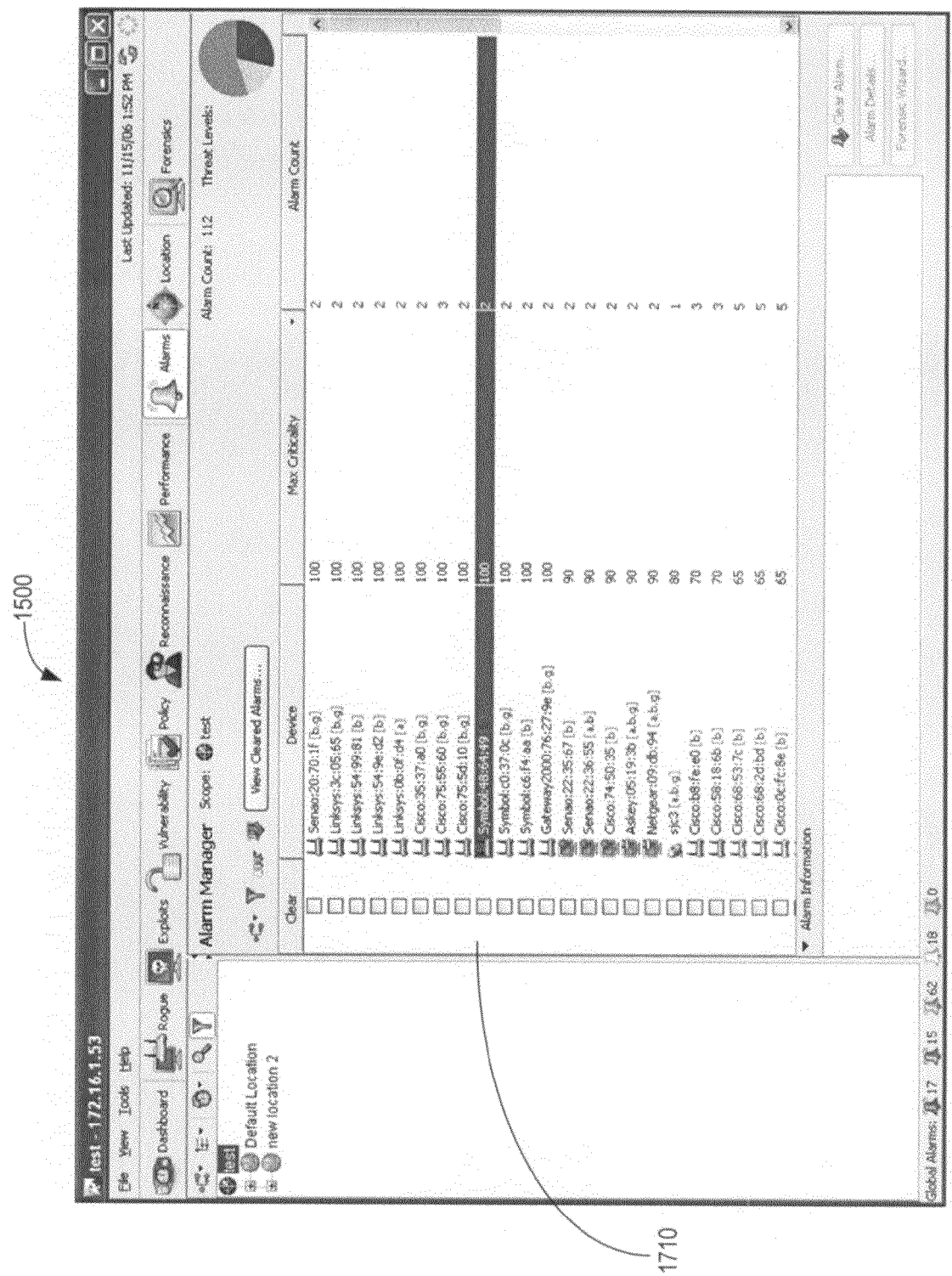
FIG. 17 illustrates an alarm manager panel with an alarm table filtered based upon device type, and sorted based upon criticality.

FIG. 16 illustrates the alarm manager panel 1500 with an alarm table 1610 filtered based upon alarm types, and sorted based upon criticality. Advantageously, filtering and sorting allows a user to view specific alarm types, and to view the most critical alarms. FIG. 17 illustrates the alarm manager panel 1500 with an alarm table 1710 filtered based upon device type, and sorted based upon criticality. Table 1710 lists each device in the network (e.g., name and MAC address), and lists the value of the alarm with the maximum criticality and the total alarm count for the device.

Figure 18:
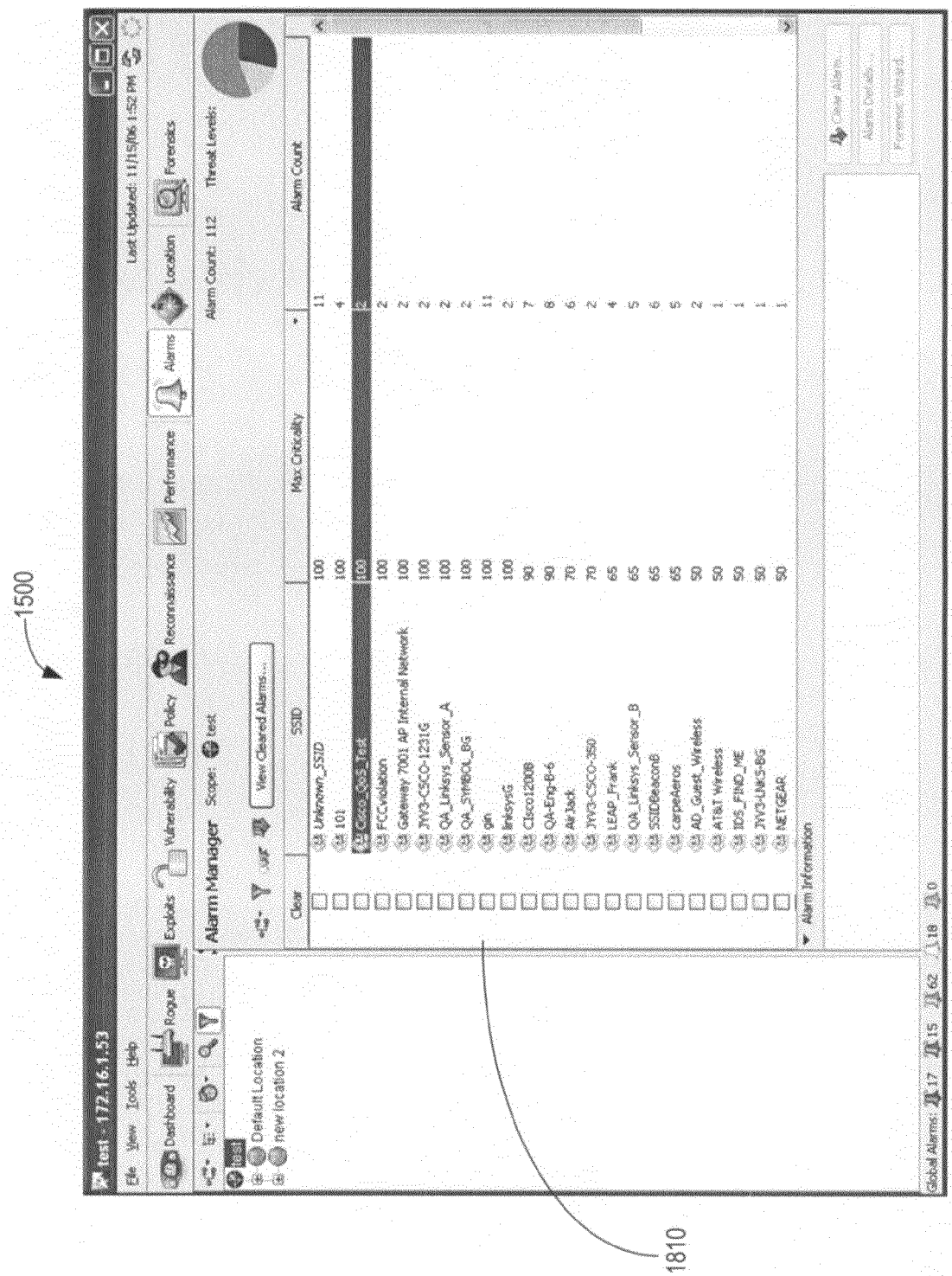
FIG. 18 illustrates an alarm manager panel with an alarm table filtered based upon SSID, and sorted based upon criticality.
Figure 19:
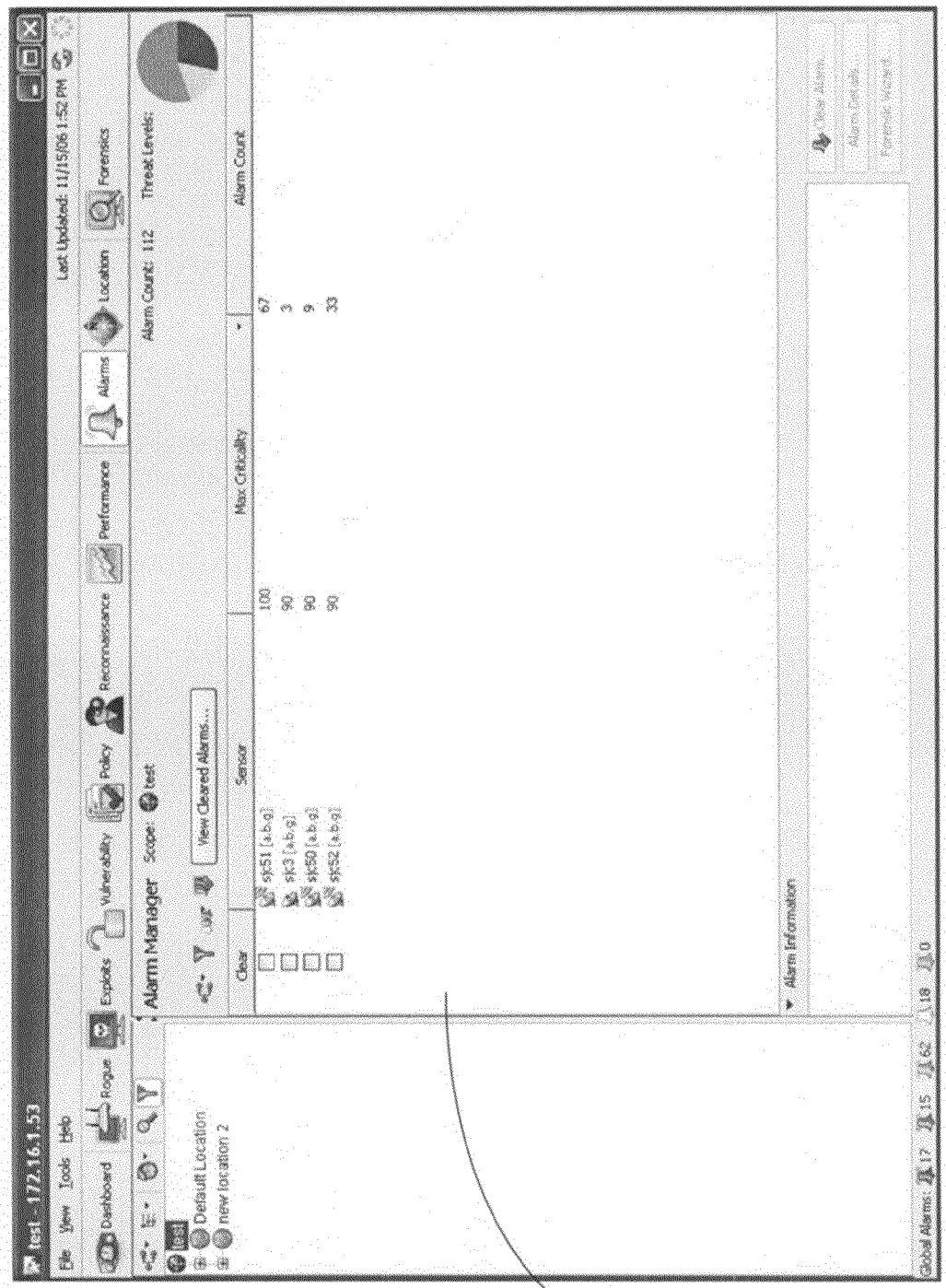
FIG. 19 illustrates an alarm manager panel with an alarm table filtered based upon sensor.
Figure 20:
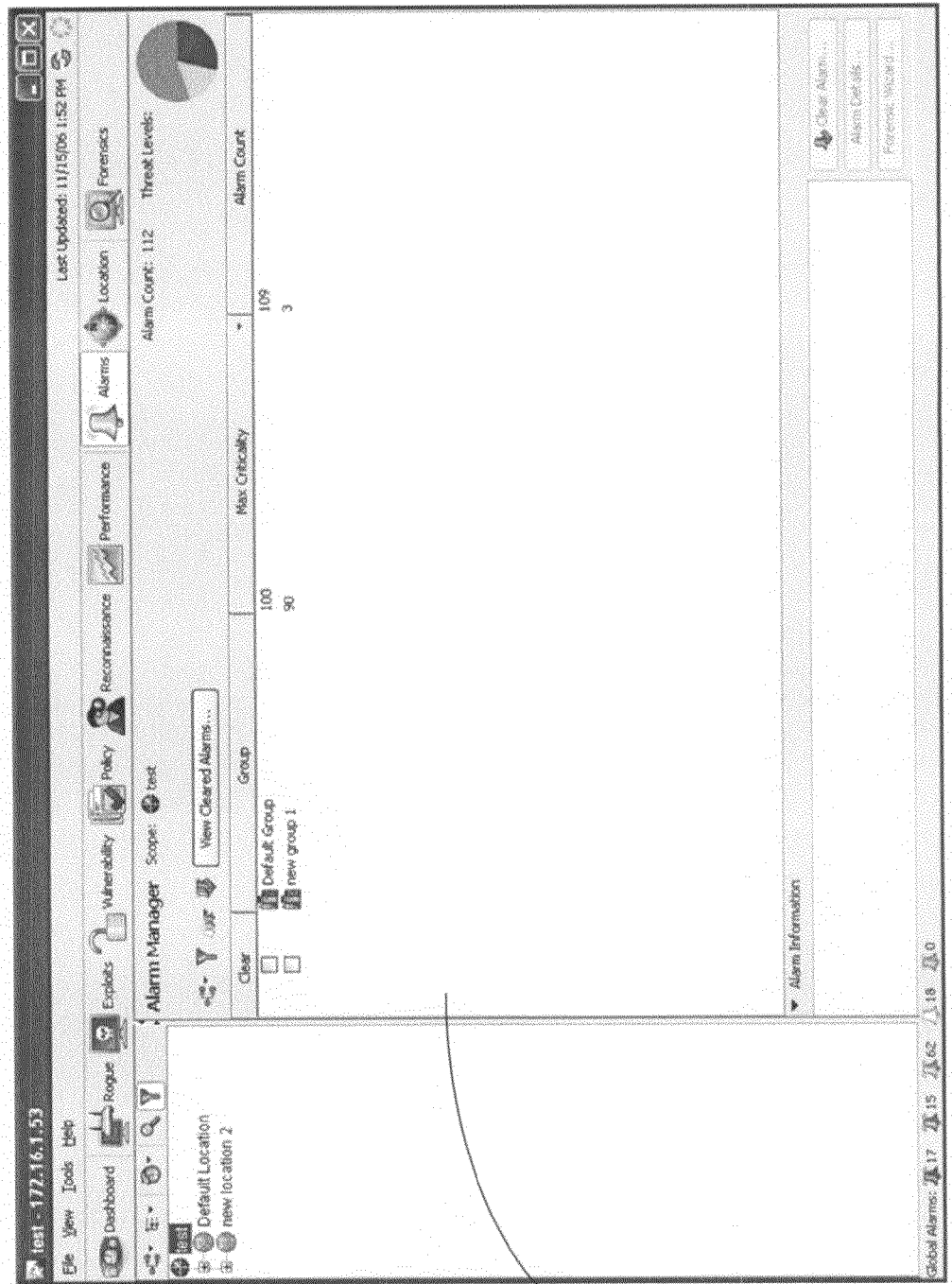
FIG. 20 illustrates an alarm manager panel with an alarm table filtered based upon device groupings.

FIG. 18 illustrates the alarm manager panel 1500 with an alarm table 1810 filtered based upon SSID, and sorted based upon criticality. FIG. 19 illustrates the alarm manager panel 1500 with an alarm table 1910 filtered based upon sensor. FIG. 20 illustrates the alarm manager panel 1500 with an alarm table 2010 filtered based upon device groupings.

Figure 21:
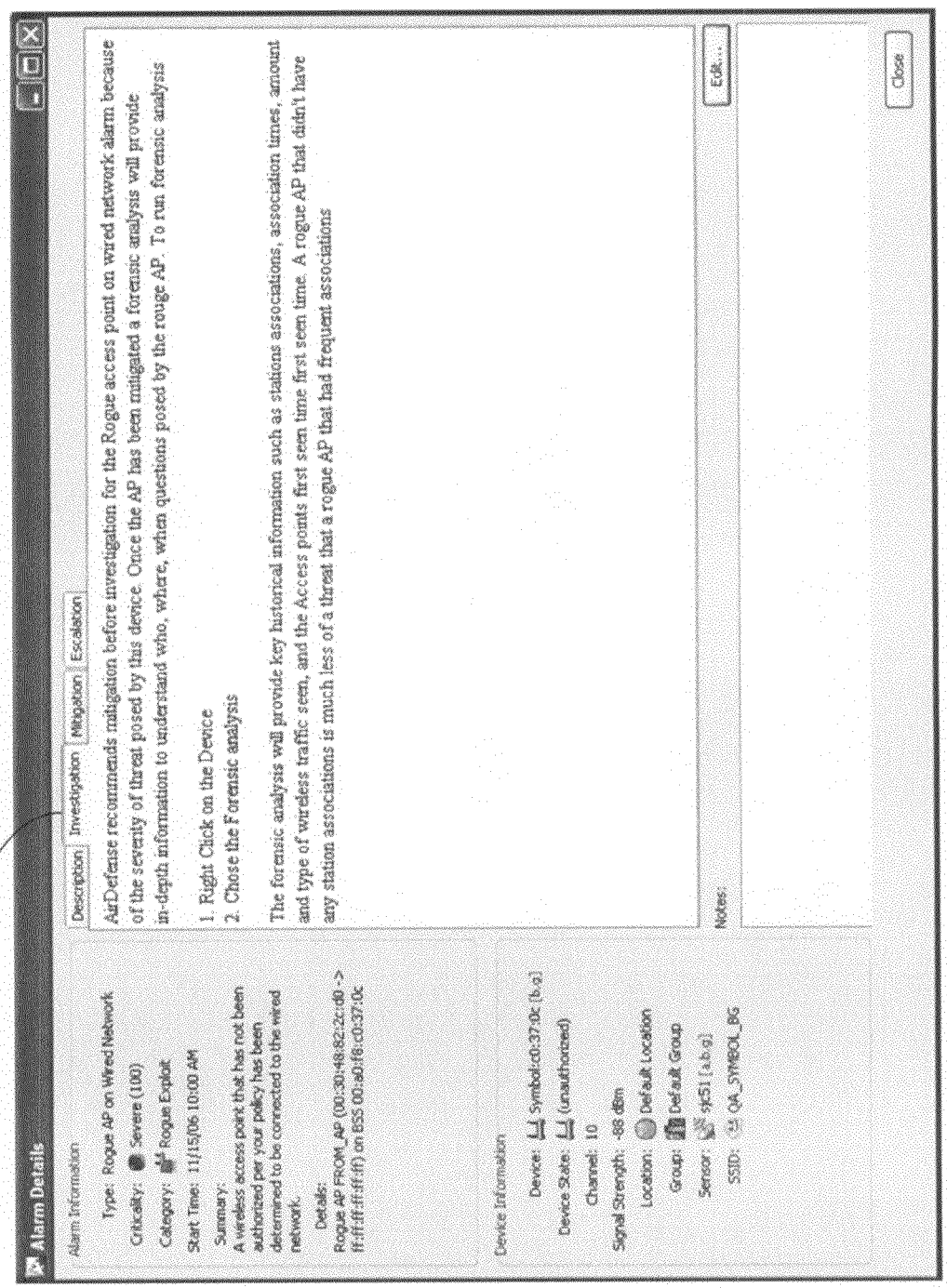
FIG. 21 illustrates an exemplary alarm details dialog.

Referring to FIG. 21, an exemplary embodiment of an alarm details dialog 2100 includes tabs for alarm description, investigation, mitigation, and escalation. An investigation tab 2110 is illustrated depicting information regarding investigation of the alarm.

Figure 22:
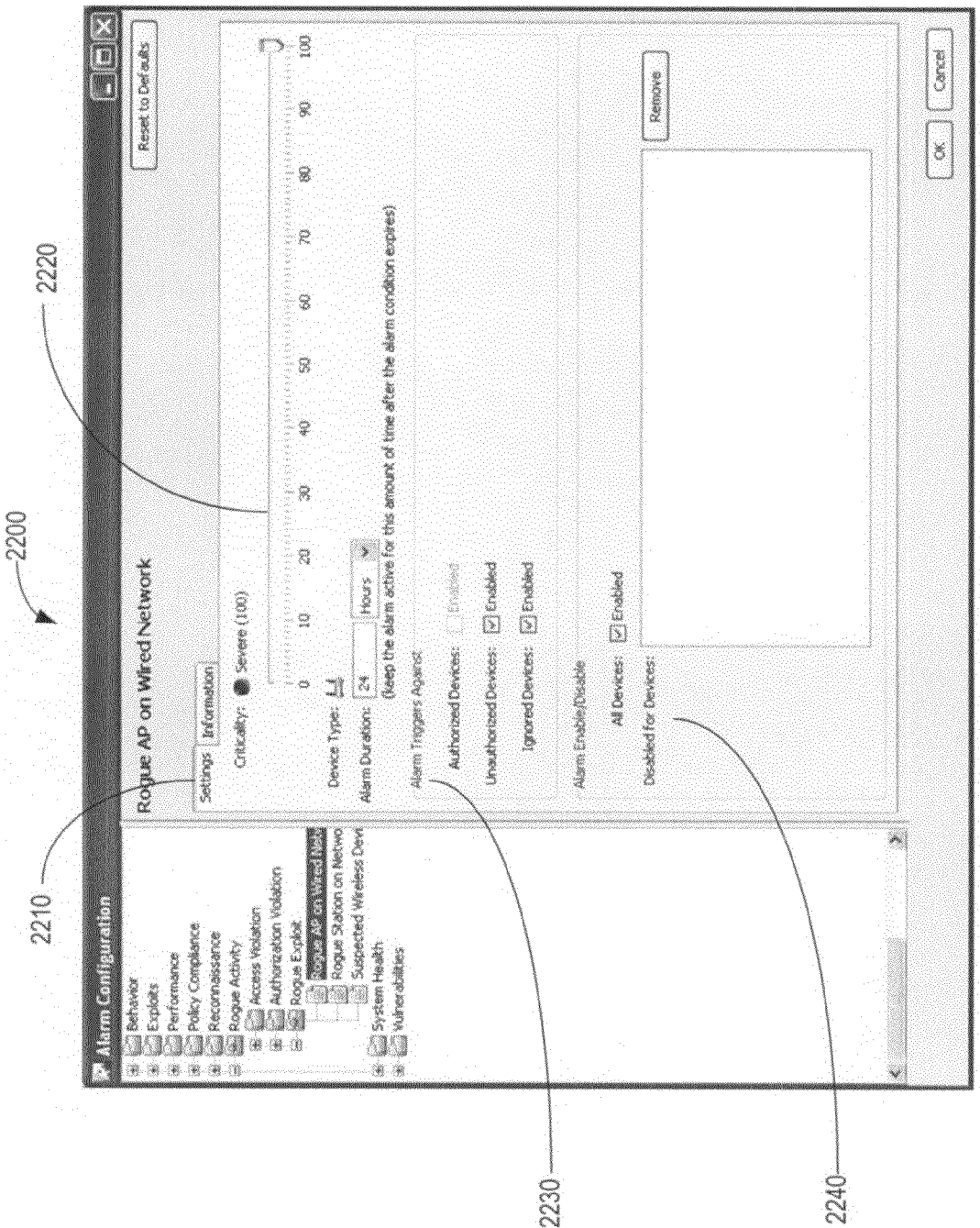
FIG. 22 illustrates an exemplary alarm configuration dialog depicting a settings tab.

Referring to FIG. 22, an exemplary embodiment of an alarm configuration dialog 2200 includes a setting 2210 and an information tab. The settings tab 2210 includes a criticality selector 2220 to adjust the threat calculation value between 0 to 100, an alarm triggers against check-box 2230 to select triggers to set the alarm off, and an enable/disable dialog 2240 to determine which devices the alarm applies to.

Figure 23:
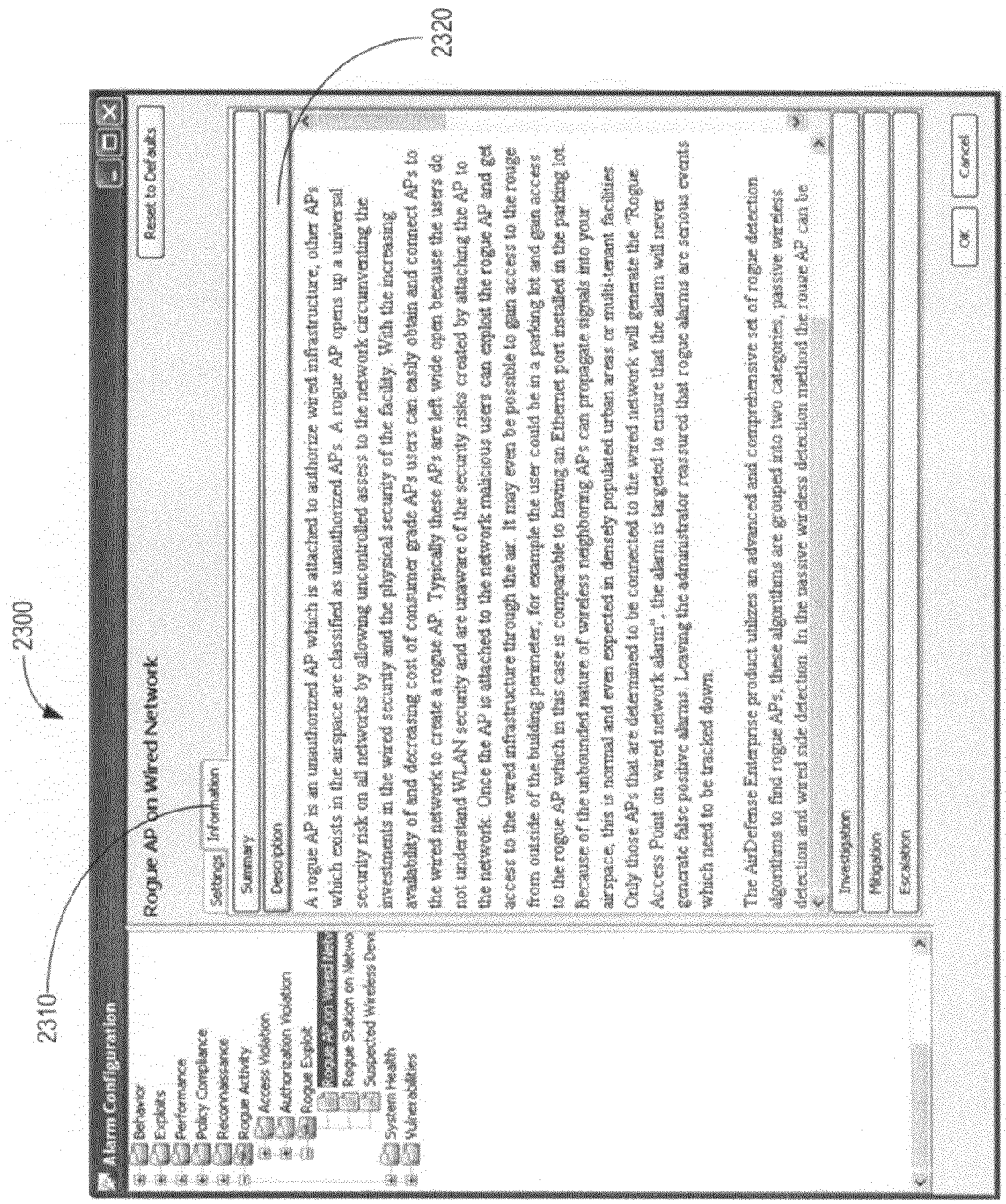
FIG. 23 illustrates an exemplary alarm configuration dialog depicting an information tab.

Referring to FIG. 23, an exemplary embodiment of an alarm configuration dialog 2300 includes a setting and an information 2310 tab. The information 2310 tab includes various tabs, such as alarm summary, description 2320, investigation, mitigation, and escalation. The alarm configuration dialog 2300 illustrates an example of the description 2320 tab for a Rogue AP on Wired Network alarm.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method of generating alarms for wireless network monitoring comprising the steps of:
   monitoring a wireless local area network;
   receiving events responsive to the monitoring step, wherein the events relate to security in the wireless local area network;
   correlating received events to triggers;
   raising an alarm responsive to one or more triggers being above a pre-defined threshold value;
   leaving the raised alarm unaffected by new events and new triggers correlated to the raised alarm thereby avoiding flooding of alarms based on a same event; and
   maintaining the alarm for a predetermined time following the one or more triggers being below the pre-defined threshold value;
   wherein the triggers are utilized in the method of generating alarms as an intermediate step between the received events and any associated alarm to reduce a volume of the generated alarms by correlating the received events with one another and with the generated alarms.

2. The method of claim 1, wherein events correspond to custom-coded signatures or are semantically defined.

3. The method of claim 1, wherein the correlating step comprises updating the trigger count corresponding to each received event.

4. The method of claim 3, wherein the trigger count is maintained in a hash table indexed to alarm type and device media access control address.

5. The method of claim 3, wherein each trigger comprises a watch time corresponding to the amount of time events are examined for and a high water threshold corresponding to the number of events in the watch time which corresponds to the trigger being above the pre-defined threshold value.

6. The method of claim 1, wherein the monitoring step is performed by a plurality of sensors, and the receiving, analyzing, and raising steps are performed by a server.

7. A method of managing alarms for wireless network monitoring comprising the steps of:
   receiving events from monitoring of a wireless local area network, wherein the events relate to security in the wireless local area network;
   correlating each received event to one or more triggers in which the received event participates, wherein the one or more triggers comprise a count of events of a pre-defined period;
   updating one or more trigger sets responsive to the one or more triggers;
   generating alarms over the pre-defined period responsive to each trigger being high in the one or more trigger sets;

leaving generated alarms unaffected responsive to newly received events correlated to the generated alarms thereby avoiding flooding of alarms based on a same event; and handling alarms to update active and inactive alarms;

wherein the one or more triggers are utilized in the method of managing alarms as an intermediate step between the received events and any associated alarm to reduce a volume of the generated alarms by correlating the received events with one another and with the generated alarms.

8. The method of claim 7, further comprising the step of: loading an alarm configuration;

wherein the alarm configuration defines the each event to one or more triggers, one or more triggers to each trigger set, and each alarm to one or more trigger sets.

9. The method of claim 7, wherein the correlating step comprises updating the one or more triggers in which the received event participates by updating the trigger count.

10. The method of claim 9, wherein the trigger count is maintained by a hash table comprising alarm objects for each alarm type and device media access control address.

11. The method of claim 7, wherein the generating step comprises the steps of:

determining if each trigger count exceeds a high threshold over the pre-defined period;

determining if each trigger count in a trigger set exceeds the high threshold for each trigger; and raising an alarm for each trigger set with all corresponding triggers exceeding the high threshold.

12. The method of claim 7, wherein the handling step comprises the steps of:

determining if each trigger count is below a low threshold over the pre-defined period;

if an alarm is active, and one of the triggers in the trigger set corresponding to the alarm is below the low threshold, then setting the alarm to inactive; and removing all inactive alarms which have been inactive for a duration period.

13. The method of claim 7, wherein the receiving, correlating, generating, and handling steps are performed by a server.

14. An alarm manager display for a wireless network, comprising:

a server comprising a display;

an alarm table listing alarms in the wireless network, wherein each alarm comprises a criticality, category, type, time, and wireless device;

a network tree comprising logical groupings of wireless network devices;

alarm information comprising detailed information about an alarm selected in the alarm table; and network alarm totals comprising a count of the total alarms in the wireless network and a pie chart depicting the breakdown of alarms by category and priority;

wherein alarms in the alarm table can be filtered by alarm priority, device type, wireless channel, signal strength, device state, date and time, and alarm category and type;

wherein alarms in the alarm table can be cleared by a user and kept cleared for a configurable time; and wherein the alarms are generated by the server based on the steps of:

receiving events responsive to monitoring a wireless local area network comprising the wireless network devices, wherein the events relate to security in the wireless local area network;

correlating received events to triggers;

raising an alarm responsive to one or more triggers being above a pre-defined threshold value;

leaving the raised alarm unaffected by new events and new triggers correlated to the raised alarm thereby avoiding flooding of alarms based on a same event; and maintaining the alarm for a predetermined time following the one or more triggers being below the pre-defined threshold value;

wherein the one or more triggers are utilized as an intermediate step between the received events and any associated alarm to reduce a volume of generated alarms in the alarm manager by correlating the received events with one another and with the generated alarms.

15. The alarm manager display of claim 14, further comprising an alarm details dialog comprising alarm information, user-editable alarm notes, alarm description, investigation information, and mitigation information.

16. The alarm manager display of claim 14, further comprising an alarm configuration dialog for a user to configure settings for alarms.

17. The alarm manager display of claim 14, wherein the criticality comprises a user-editable threat calculation value between 0 and 100, wherein the threat calculation value is utilized to calculate a threat index for devices, groups, locations, and the wireless network.

18. The alarm manager display of claim 14, wherein the alarm manager display is configure to minimize alarms by utilizing events, triggers, and trigger sets to provide one alarm per a plurality of events.

19. The method of claim 1, wherein each of the triggers comprises an alarm related event on the wireless local area network, and each of the triggers relates to a specific device on the wireless local area network.

20. The method of claim 19, wherein the alarm related event comprises any of privacy encryption violation, identification theft, unauthorized rogue Access Point, and wireless local area network Jack signature.

* * * * *

UNITED STATES PATENT AND TRADEMARK OFFICE
CERTIFICATE OF CORRECTION

PATENT NO. : 8,205,244 B2
APPLICATION NO. : 11/711371
DATED : June 19, 2012
INVENTOR(S) : Nightingale et al.

Page 1 of 1

It is certified that error appears in the above-identified patent and that said Letters Patent is hereby corrected as shown below:

In Fig. 14, Drawing Sheet 14 of 23, for Tag "1450", delete "Investifation" and insert
-- Investigation --, therefor.

In Column 3, Line 56, delete "troubleshooting" and insert -- troubleshooting. --, therefor.

Signed and Sealed this
Twenty-ninth Day of January, 2013

David J. Kappos
*Director of the United States Patent and Trademark Office*